United States Patent
McClintock et al.

(10) Patent No.: US 10,013,500 B1
(45) Date of Patent: Jul. 3, 2018

(54) BEHAVIOR BASED OPTIMIZATION FOR CONTENT PRESENTATION

(71) Applicant: AMAZON TECHNOLOGIES, INC., Reno, NV (US)

(72) Inventors: Jon Arron McClintock, Seattle, WA (US); Jesper Mikael Johansson, Redmond, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 540 days.

(21) Appl. No.: 14/100,411

(22) Filed: Dec. 9, 2013

(51) Int. Cl.
*H04L 29/08* (2006.01)
*G06F 11/34* (2006.01)
*G06F 17/30* (2006.01)

(52) U.S. Cl.
CPC .... *G06F 17/30899* (2013.01); *G06F 11/3438* (2013.01); *G06F 17/3089* (2013.01); *G06F 17/30867* (2013.01); *G06F 17/30905* (2013.01); *H04L 67/02* (2013.01); *H04L 67/22* (2013.01)

(58) Field of Classification Search
CPC ............... G06F 15/16; G06F 11/3438; G06F 17/30867; G06F 17/3089; G06F 17/30899; G06F 17/30905; H04L 67/02; H04L 67/22
See application file for complete search history.

(56) References Cited

U.S. PATENT DOCUMENTS

| | | | | |
|---|---|---|---|---|
| 6,345,279 B1 * | 2/2002 | Li | ..................... | G06F 17/30905 |
| 6,657,647 B1 * | 12/2003 | Bright | ................. | G06F 17/3089 345/157 |
| 6,785,671 B1 * | 8/2004 | Bailey | ............... | G06F 17/30864 705/26.81 |
| 6,950,852 B1 * | 9/2005 | Kobayaghi | ............. | H04L 29/06 709/204 |
| 7,146,416 B1 * | 12/2006 | Yoo | .................... | G06F 17/30867 707/E17.119 |
| 7,281,252 B1 * | 10/2007 | Lindquist | ............ | G06F 17/3089 707/E17.116 |
| 7,529,835 B1 * | 5/2009 | Agronow | .......... | G06F 17/30902 709/203 |
| 7,636,677 B1 * | 12/2009 | McGonigal | ....... | G06F 17/30867 705/26.7 |
| 7,647,309 B1 * | 1/2010 | Bar | ........................ | G06Q 30/06 705/26.1 |
| 7,752,251 B1 * | 7/2010 | Shuster | ................... | G06F 15/16 709/200 |
| 8,005,943 B2 * | 8/2011 | Zuzga | ................. | G06F 11/3419 709/224 |
| 8,447,831 B1 * | 5/2013 | Sivasubramanian | | H04L 61/1511 709/216 |

(Continued)

Primary Examiner — Aaron Strange

(74) Attorney, Agent, or Firm — Lindauer Law, PLLC

(57) ABSTRACT

Techniques are described for determining a priority order for generating, serving, or rendering components of content such as a web page. Behavioral data may be collected from user devices, the behavioral data describing user interactions with components of the content during previous presentations of the content on the user devices. Based on the behavioral data, a score may be determined for one or more of the components, the score based on component dwell times, component presentation frequency, or other information. A priority order for the components may be based on the determined scores, and the components may be generated, served, or rendered in the priority order.

20 Claims, 12 Drawing Sheets

(56) References Cited

U.S. PATENT DOCUMENTS

| | | | | |
|---|---|---|---|---|
| 8,762,225 | B1* | 6/2014 | Dean | G06F 17/30011 705/26.1 |
| 8,893,014 | B1* | 11/2014 | Au | G06F 17/30902 715/234 |
| 9,483,449 | B1* | 11/2016 | Wood | G06F 17/2247 |
| 2002/0072981 | A1* | 6/2002 | Park | G06Q 30/0601 705/26.1 |
| 2002/0143630 | A1* | 10/2002 | Steinman | G06Q 30/02 705/14.14 |
| 2003/0059200 | A1* | 3/2003 | Cuijpers | H04N 5/76 386/213 |
| 2003/0135460 | A1* | 7/2003 | Talegon | G06Q 20/102 705/40 |
| 2004/0054784 | A1* | 3/2004 | Busch | G06F 17/3089 709/228 |
| 2004/0070606 | A1* | 4/2004 | Yang | G06Q 30/02 715/745 |
| 2004/0139192 | A1* | 7/2004 | Spaid | G06F 17/3089 709/224 |
| 2004/0255003 | A1* | 12/2004 | Tecu | G06F 17/30902 709/217 |
| 2005/0096979 | A1* | 5/2005 | Koningstein | G06Q 10/10 705/14.68 |
| 2005/0267809 | A1* | 12/2005 | Zheng | G06Q 30/02 705/14.55 |
| 2006/0059144 | A1* | 3/2006 | Canright | G06F 17/30011 |
| 2006/0173743 | A1* | 8/2006 | Bollay | G06Q 30/02 705/14.41 |
| 2006/0282335 | A1* | 12/2006 | Hanks | G06Q 30/02 705/14.4 |
| 2007/0198504 | A1* | 8/2007 | Feng | G06F 17/30864 |
| 2007/0226640 | A1* | 9/2007 | Holbrook | G06F 17/30864 715/765 |
| 2007/0276904 | A1* | 11/2007 | Satou | G06Q 10/00 709/203 |
| 2008/0209336 | A1* | 8/2008 | Brown | G06F 17/30873 715/744 |
| 2008/0262909 | A1* | 10/2008 | Li | G06Q 30/02 705/14.49 |
| 2009/0037355 | A1* | 2/2009 | Brave | G06F 17/30867 706/45 |
| 2009/0276716 | A1* | 11/2009 | Chua | G06F 17/30896 715/744 |
| 2010/0218089 | A1* | 8/2010 | Chao | G09G 5/14 715/246 |
| 2011/0302510 | A1* | 12/2011 | Harrison | G06F 17/2247 715/760 |
| 2012/0030011 | A1* | 2/2012 | Rey | G06Q 30/0242 705/14.43 |
| 2012/0079518 | A1* | 3/2012 | Wan | H04H 60/45 725/14 |
| 2013/0104024 | A1* | 4/2013 | Rajkumar | G06F 17/30781 715/234 |
| 2013/0191207 | A1* | 7/2013 | Smallwood | G06Q 30/0241 705/14.41 |
| 2014/0143304 | A1* | 5/2014 | Hegarty | G06F 11/3438 709/203 |
| 2014/0279043 | A1* | 9/2014 | Yi | G06F 17/2247 705/14.66 |
| 2015/0074232 | A1* | 3/2015 | Phillips | H04L 65/604 709/219 |
| 2015/0324271 | A1* | 11/2015 | Glass | G06F 3/0482 707/706 |

* cited by examiner

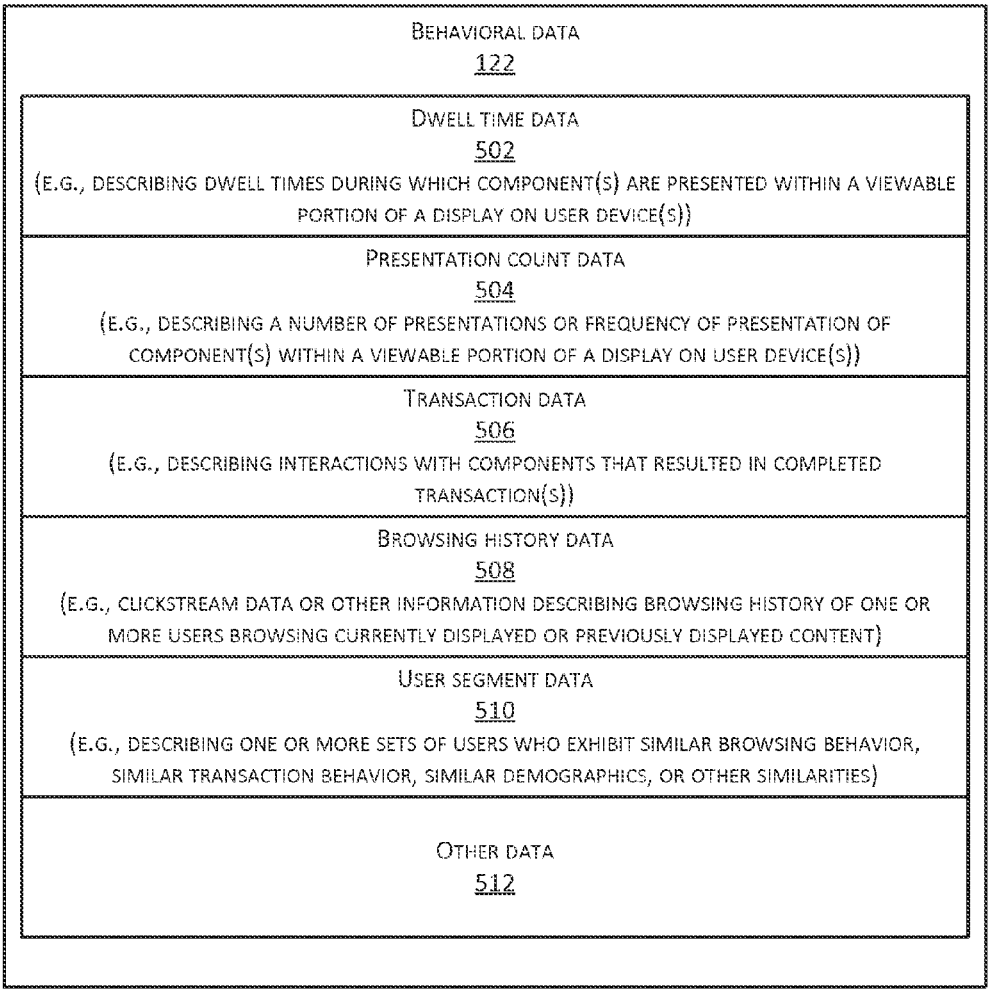

500

BEHAVIORAL DATA
122

DWELL TIME DATA
502
(E.G., DESCRIBING DWELL TIMES DURING WHICH COMPONENT(S) ARE PRESENTED WITHIN A VIEWABLE PORTION OF A DISPLAY ON USER DEVICE(S))

PRESENTATION COUNT DATA
504
(E.G., DESCRIBING A NUMBER OF PRESENTATIONS OR FREQUENCY OF PRESENTATION OF COMPONENT(S) WITHIN A VIEWABLE PORTION OF A DISPLAY ON USER DEVICE(S))

TRANSACTION DATA
506
(E.G., DESCRIBING INTERACTIONS WITH COMPONENTS THAT RESULTED IN COMPLETED TRANSACTION(S))

BROWSING HISTORY DATA
508
(E.G., CLICKSTREAM DATA OR OTHER INFORMATION DESCRIBING BROWSING HISTORY OF ONE OR MORE USERS BROWSING CURRENTLY DISPLAYED OR PREVIOUSLY DISPLAYED CONTENT)

USER SEGMENT DATA
510
(E.G., DESCRIBING ONE OR MORE SETS OF USERS WHO EXHIBIT SIMILAR BROWSING BEHAVIOR, SIMILAR TRANSACTION BEHAVIOR, SIMILAR DEMOGRAPHICS, OR OTHER SIMILARITIES)

OTHER DATA
512

FIG. 5

BEHAVIOR BASED OPTIMIZATION FOR CONTENT PRESENTATION

BACKGROUND

In a content-rich web site, a web page may include a large number of components. Responses to requests for the web page may be delayed while the elements are generated on a server, communicated to the requester, and rendered in a web browser. When the web site is experiencing a high volume of requests, such delays may degrade the user experience of users browsing the web page and may lead to a reduction in web site traffic or lost sales.

BRIEF DESCRIPTION OF THE DRAWINGS

FIG. 5 depicts a schematic of example behavioral data that may be employed to determine a priority order for communicating or presenting components of content.

Figure 1:
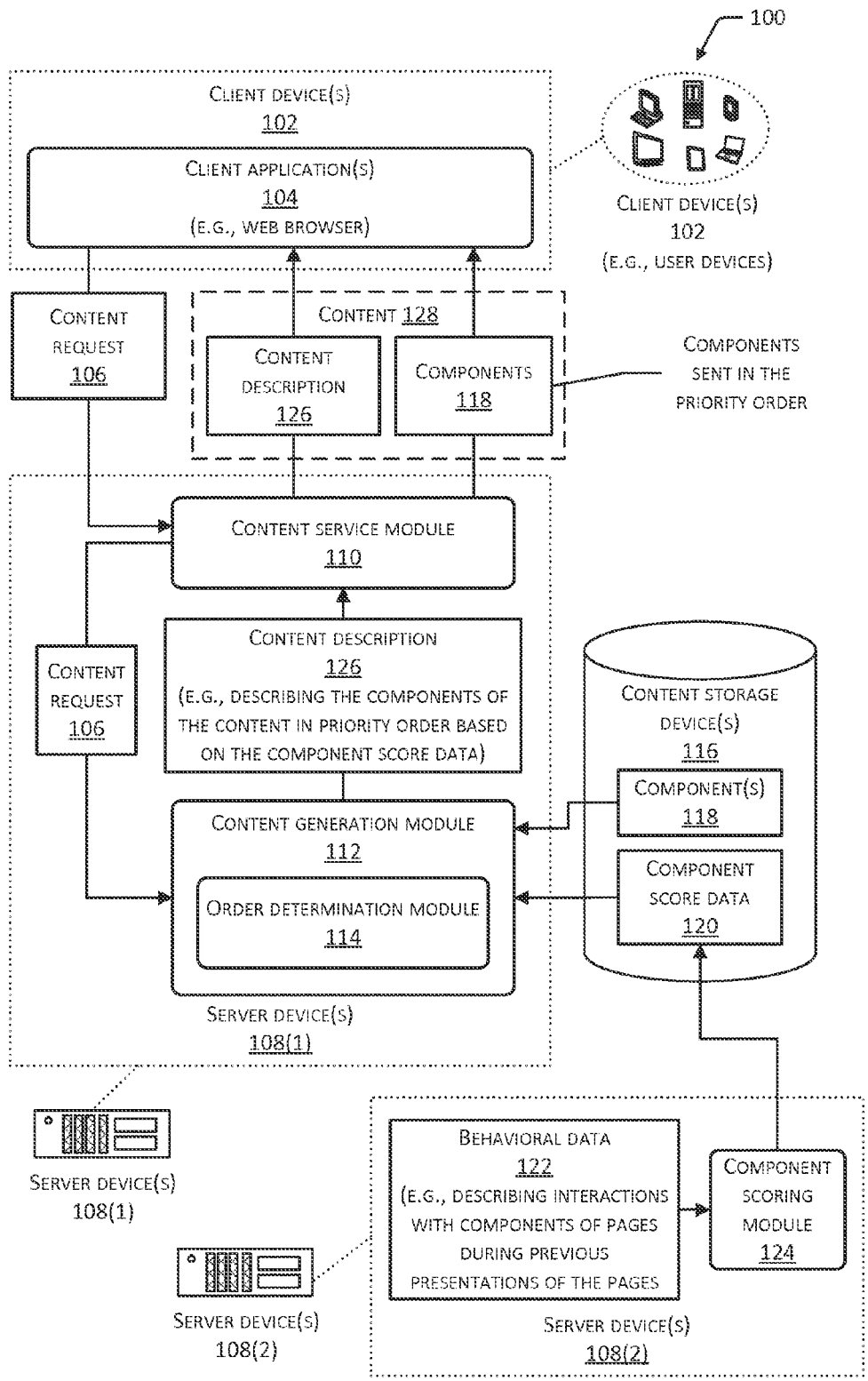
FIG. 1 depicts an environment including a content server device for serving content to a client device, the content including a plurality of components that are generated, communicated, or rendered according to a priority order that is determined based on collected behavioral data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for serving content to be presented on a client device, the content including components that are generated, communicated, or presented in a priority order that is based at least partly on behavioral data. On receiving a request for content such as a web page, a server may determine components (e.g., scripts, images, text, controls, and so forth) to be presented within the content. The components may be communicated to the requesting device in a default order that is based on the order in which the components are listed in the source code or other description of the content, and the requesting device may render the components in the order in which they were received at the requesting device. In some cases, the sending and rendering of the components in a default order may lead to a delay in presenting one or more components that are useful or interesting to a user viewing the content. For example, when browsing an online store or an electronic commerce web site, a user who navigates to a product page may experience a delay while a product description, price, or product image is rendered. Such a delay may degrade the user's experience and lead to lost sales or lost traffic through the web site.

Implementations determine a priority order for generating, sending, or presenting components of content, based on collected behavioral data that describes previous interactions of users with components. The behavioral data associated with a component may include dwell time data describing an amount of time during which the component was presented within a viewable portion of a display on one or more user devices. Behavioral data may include presentation count data describing a number of presentations or a frequency of presentation of the component within the viewable portion of the display on one or more user devices. Behavioral data may also include transaction data describing how frequently the presentation of, or interactions with, a component led to a completed transaction (e.g., a sale of a product) through the presented content. Behavioral data may also include other types of data that describe interactions with components of content. The behavioral data may describe interactions between users and components of content. The behavioral data may also describe interactions between automated processes and components of content.

In some implementations, the behavioral data may be analyzed to determine a score for each of one or more components described in the behavioral data. The score for a component may quantify how often users interact with the component, the length of such interactions, or the contribution of such interactions to a completed transaction. For example, the score for a component may be higher if the behavioral data indicates that users tend to interact with the component more frequently than other components (e.g., manipulate a button or other control, click to expand an image, play a video, and so forth). The score for a component may also be higher if the behavioral data indicates that users tend to view the component for longer periods of time than other components, based on measured dwell times when the component was presented within a viewable portion of a page on a user device (e.g., while the page was scrolled to a portion that includes the component). Moreover, the score for a component may be higher if the behavioral data indicates that interactions with that component tend to lead to completed transactions. The score of a component may be determined for a general population of users, for an individual user, or for a set of users (e.g., a user segment) that are substantially similar with respect to their browsing or purchasing behaviors, their demographic characteristics, their location, their language group, and so forth.

In some cases, the scores may be within a numeric range (e.g., 0 to 100) with one boundary of the range (e.g., 0) indicating a lowest priority and the other boundary (e.g., 100) indicating a highest priority. Alternatively the scores may be described more qualitatively, such as a "low," "medium," and "high" priority. Although the examples herein describe a numeric range of scores such that a higher number indicates a higher priority, implementations are not so limited. In some cases, a numeric range of scores may be arranged such that a lower number indicates a higher priority and a higher number indicates a lower priority. The scores may be discrete values or may be included in a continuous range of values. Implementations are not limited to any particular range, data type, or format for the scores.

In some implementations, on receiving a request for content the scores for components of the requested content may be employed to determine a priority order of the components. For example, in cases where a higher score indicates a more frequently used or longer viewed component, the priority order may prioritize the generation, communication, or presentation of higher scored components over lower scored components. The priority order may be employed to determine the order in which to dynamically generate the components on a server device, or the order in which to generate static components (e.g., retrieve static components from content storage). The priority order may be employed to determine the order in which to send the components to the requesting client device. The priority order may also be employed to determine the order in which to present the components on the requesting client device. By prioritizing the generation, communication, or presentation of those components that are more frequently viewed or interacted with by users, that are viewed longer, or that are more likely to contribute to completed transactions, implementations may reduce the latency of presenting useful or interesting components to users and may thus improve the user experience. For example, a priority order may be determined such that a search box, navigation controls, or other features are rendered prior to other content, to enable a user to begin interacting with the content earlier than may otherwise be possible absent the priority ordering described herein. Priority ordering of those components that tend to lead to completed transactions may also increase revenues generated through the presented content, such as sales generated through a web page included in an online store.

FIG. 1 depicts an environment 100 for delivering content, such as web pages or other types of information. As shown in FIG. 1, the environment 100 may include one or more client devices 102. In some cases, the client device(s) 102 may include user devices such as a personal computer, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. Such user devices may be substantially mobile user devices (e.g., smartphones or tablet computers) or substantially less mobile user devices (e.g., desktop computers). The client device(s) 102 may also include other types of devices, such as a server computer, a network computer, a cloud computing or distributed computing device, and so forth. In some cases, two or more of the client devices 102 may comprise a cluster, cloud, farm, or other grouping of multiple devices that coordinate operations to provide load balancing, failover support, parallel processing capabilities, shared storage resources, or other aspects. The client device(s) 102 are described further with reference to FIG. 6.

The client device(s) 102 may execute one or more client application(s) 104 that are configured to present content. For example, the client application(s) 104 may include a web browser or other user agent configured to present one or more web pages for one or more web sites. Implementations support the use of any web browser, including but not limited to one or more of the following: Mozilla™ Firefox™; Microsoft™ Internet Explorer™; Google™ Chrome™; Apple™ Safari™; Rockmelt™; and so forth. Implementations also support the use of a web browser, such as the Amazon™ Silk™ browser, in which the processing of content is performed partly on the client device 102 and partly on a server device or some other device. In such cases, one or more web browser subsystems may execute on the client device 102, and one or more web browser subsystems may execute on one or more server devices or other devices. Although the examples herein describe presenting web pages presented within a web browser executing on the client device(s) 102, implementations are not so limited. Implementations support the presentation of other types or formats of content on the client device(s) 102, in any type of the client application(s) 104. Accordingly, the client application(s) 104 may be arranged to present one or more particular types of content, or may be arranged to present a broad range of different types of content.

The client application(s) 104 may enable one or more users of the client device(s) 102 to generate a content request 106 that is sent to one or more server devices 108. The content request 106 may identify and request one or more portions of content to be communicated to the client device(s) 102 and presented within the client application(s) 104. In cases where the client application(s) 104 include a web browser, the content request 106 may be in the form of a Hypertext Transfer Protocol (HTTP) or a HTTP Secure (HTTPS) request. In such cases, the content request 106 may include one or more Uniform Resource Identifiers (URIs), such as Uniform Resource Locators (URLs) or Uniform Resource Names (URNs), or other identifiers that identify the requested content. In some cases, the content request 106 may be sent and the requested content may be received over a secured connection between the client device(s) 102 and the server device(s) 108, the secured connection employing a security protocol such as any version of the Secure Socket Layer (SSL) or the Transport Layer Security (TLS) protocol.

The server device(s) 108 may comprise any type of computing device, including but not limited to any of the types of computing devices described with reference to the client device(s) 102. In some cases, two or more of the server devices 108 may comprise a cluster, cloud, farm, or other grouping of multiple devices that coordinate operations to provide load balancing, failover support, parallel processing capabilities, shared storage resources, or other aspects. The server device(s) 108 are described further with reference to FIG. 7. Although devices may be described herein as either client device(s) 102 or server device(s) 108, such descriptions are not limiting of implementations. In some cases, the client device(s) 102 may provide at least some functionality described with reference to the server device(s) 108, and the server device(s) 108 may provide at least some functionality described with reference to the client device(s) 102. Accordingly, the various computing devices described herein may exhibit characteristics of the client device(s) 102, the server device(s) 108, or both client device(s) 102 and server device(s) 108.

In implementations illustrated in FIG. 1, the content request 106 may be received by the server device(s) 108(1) that may include one or more content servers, backend servers, or other devices configured to generate dynamic or static content for the requested content. The content request 106 may be received by a content service module 110 executing on the server device(s) 108(1). The content service module 110 may provide the content request 106 to a content generation module 112 executing on the server device(s) 108(1). In some cases, the content service module 110 may perform initial processing of the content request 106 to determine whether the requested content exists or is valid, before providing the content request 106 to the content generation module 112. The content generation module 112 may analyze the content request 106 and determine the requested content based on the identification of the content (e.g., the URI) included in the content request 106. In some implementations, the content generation module 112 may include an order determination module 114 that operates to determine a priority order in which to generate, communicate, or present components of the requested content. Operations of the content generation module 112 and the order determination module 114 are described further with reference to FIGS. 9-12.

The content generation module 112 may communicate with one or more content storage device(s) 116 that store content to be presented. The content storage device(s) 116 may comprise any type of data storage system or datastore, and may be a relational or a non-relational datastore. Implementations support any type or format of data storage for the content storage device(s) 116, including but not limited to a database, an array, a structured list, a tree, a key-value storage, flat files, unstructured data, or any other data structure or format. Although the content storage device(s) 116 are depicted as external to the client device(s) 102 and the server device(s) 108, in some implementations the content storage device(s) 116 may be at least partly incorporated into the client device(s) 102, the server device(s) 108, or both the client device(s) 102 and the server device(s) 108. In some cases, the content storage device(s) 116 may include one or more devices or processes (e.g., services) that perform operations to generate the requested content.

The content storage device(s) 116 may store, generate, or otherwise provide one or more components 118 to be presented within content. Implementations support any type of the components 118, including any type of data in any format and of any size, in a compressed or uncompressed form, and in an encrypted or unencrypted form. The components 118 may include, but are not limited to, one or more of the following:

Substantially static content files including data and metadata described using any version of Hypertext Markup Language (HTML), Dynamic HTML (DHTML), Extensible HTML (XHTML), Extensible Markup Language (XML), or other types of character data encoded using American Standard Code for Information Exchange (ASCII), Unicode, or any other format;

Script files that provide dynamic content using any scripting language or other type of programming language, including any version of JavaScript™, VBScript™, Perl™, Common Gateway Interface (CGI), Cascading Style Sheets (CSS), other types of style sheets, and so forth;

Image files such as a version of the Joint Photographic Experts Group (JPEG) format, the Graphics Interchange Format (GIF), the Bitmap (BMP) image file format, and so forth;

Audio, video, or multimedia content files, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth; or User interface components or controls, including but not limited to menus, menu items, input boxes, buttons, radio buttons, checkboxes, drop down lists, tabs, tree controls, zoom controls, selectable icons, and so forth.

For a portion of content specified in the content request 106, the content generation module 112 may determine one or more of the components 118 to be presented within the content. In some cases, this determination may be based on a Document Object Model (DOM) or other description of the content stored in the content storage device(s) 116. Alternatively, the determination may be based on information received from other processes executing on the server device(s) 108 or elsewhere. For each of the components 118 to be presented within the requested content, the content generation module 112 may also access component score data 120 that describes a score for one or more of the components 120. In some implementations, as shown in FIG. 1, the component score data 120 may be generated on one or more server device(s) 108(2). The server device(s) 108(2) may store or have access to behavioral data 122 that describes previous interactions of users with one or more components 118 of content during previous presentations of the content. The behavioral data 122 is described further with reference to FIG. 5. The server device(s) 108(2) may execute a component scoring module 124 that is configured to analyze the behavioral data 122 and generate the component score data 120. The generation of the component score data 120 is described further with reference to FIG. 8. Although FIG. 1 depicts the server device(s) 108(1) generating and serving content, and the server device(s) 108(2) generating the component score data 120, in some implementations at least a portion of these operations may be performed on a single computing device or cluster of computing devices.

The content generation module 112 may access the component(s) 118 and the component score data 120, and may generate a content description 126 for the requested content. The content description 126 and the component(s) 118 may comprise the content 128 to be presented on the client device(s) 102. In implementations illustrated by FIG. 1, the content description 126 may describe the components 118 of the content 128 in a priority order that is determined by the order determination module 114 based on the component score data 120. In some cases, the content description 126 may describe a framework (e.g., a wire frame) for the content 128 to be presented on the client device(s) 102, where the framework indicates a position for presenting each of the components 118 of the content 128. In cases where the content 128 is a web page, the content description 126 may be specified using any version of HTML, DHTML, XHTML, and so forth. The content description 126 may include one or more metadata tags (e.g., div or span tags) that indicate the position for presenting each of the components 118 of the content 128. In such cases, the ordering of the metadata tags specifying the components 118 in the content description 126 may be according to the priority order. By specifying the components 118 in the priority order in the content description 126, implementations may enable the components 118 to be communicated to the client device(s) 102 in the priority order, presented within the client application(s) 104 in the priority order, or both communicated and presented in the priority order.

Implementations support the generation, communication, and presentation of content 128 that includes static content, dynamic content, or both static and dynamic content. Static content of the content 128 may include content that is substantially the same or similar across multiple renderings and presentations of the content 128. Such static content may be generated by retrieving static content from the content storage device(s) 116 or from other storage. Dynamic content of the content 128 may include content that is generated in response to the content request 106, e.g., substantially in real time relative to the receiving of the content request 106. Dynamic content may be based on one or more of the following: the identity of the client device 102 that sent the content request 106; one or more characteristics of the client device 102; the identity of a user that generated the content request 106 using the client application(s) 104; or one or more characteristics of the user. Accordingly, dynamic content may change in at least some aspects across multiple renderings and presentations of the content 128.

The content description 126 may be provided by the content generation module 112 to the content service module 110. The content service module 110 may then communicate the content description 126 (e.g., the source code of the content 128) to the client application(s) 104 on the client device(s) 102 as a response to the content request 106. The client application(s) 104 may parse or otherwise analyze the content description 126, and request the components 118 to be presented within the content 128. The components 118 may then be communicated to the client application(s) 104 in response to requests for the components 118. In some cases, the content description 126 and the components 118 may be communicated to the client device(s) 102 within a same stream, within a same connection, or during a same communication session. Alternately, any number of multiple streams, connections, or sessions may be employed to communicate the content description 126 and the components 118.

In the example of FIG. 1, the components 118 are communicated in the priority order determined based at least partly on the component score data 120. In some cases, the components 118 may be communicated to the client device(s) 102 in response to individual requests for the components 118 sent from the client device(s) 102 to the server device(s) 108(1). Alternatively, in some cases the content service module 110 or another module of the server device(s) 108(1) may send one or more of the components 118 to the client device(s) 102 in response to the original content request 106, without receiving additional requests for the particular components 118. The components 118 may be sent to the client device(s) 102 serially or in parallel. In some cases, different ones of the components 118 may be sent to the client device(s) 102 from different server devices 108. In such cases, content description 126 may include references to the components 118 that include different hostnames or network locations (e.g., URIs) for the components 118. On receiving the components 118, the client application(s) 104 may present the components 118 within the framework described by the content description 126.

The server device(s) 108 depicted in FIG. 1 may perform any number of roles within the environment 100. In some cases, the server device(s) 108 may include backend server devices or content server devices that generate the content 128 to be served to the client device(s) 102. The server device(s) 108 may also include intermediate server devices or edge server devices that receive the content request(s) 106, perform initial processing, and forward the content request(s) 106 to one or more content servers or backend servers. Moreover, in some cases the server device(s) 108 may include content cache servers that are physically located in proximity to the client device(s) 102, such as in a user's home or office, and operate to provide cached or otherwise stored content. Accordingly, in some cases, the server device 108 that executes the content service module 110 to receive the content request 106 and serve the content 128 and its components 118 may be a different server than the server device 108 that executes the content generation module 112 to generate the dynamic or static content of the content 128. Moreover, in some cases the client device(s) 102 may include one or more intermediary devices that may pre-process, analyze, or cache content before sending it to be presented in the client application 104 executing on another client device 102.

Although the examples herein may describe the content 128 as web content (e.g., web pages) to be presented in a web browser, and may describe the components 118 as web page resources that may be rendered in a web browser, implementations are not so limited. Implementations support any type or format of content, information, or data in the content 128 and the components 118. Implementations provide for the presentation of content which includes any number of items (e.g., the components 118) that may be arranged as branch and leaf nodes in a graph, such that the items may exhibit a hierarchical relationship with one another and such that one item may refer to another item. For example, in some implementations the content may be an executable program that includes or refers to multiple program sections, or that calls other programs, libraries, interfaces, and so forth.

Figure 2:
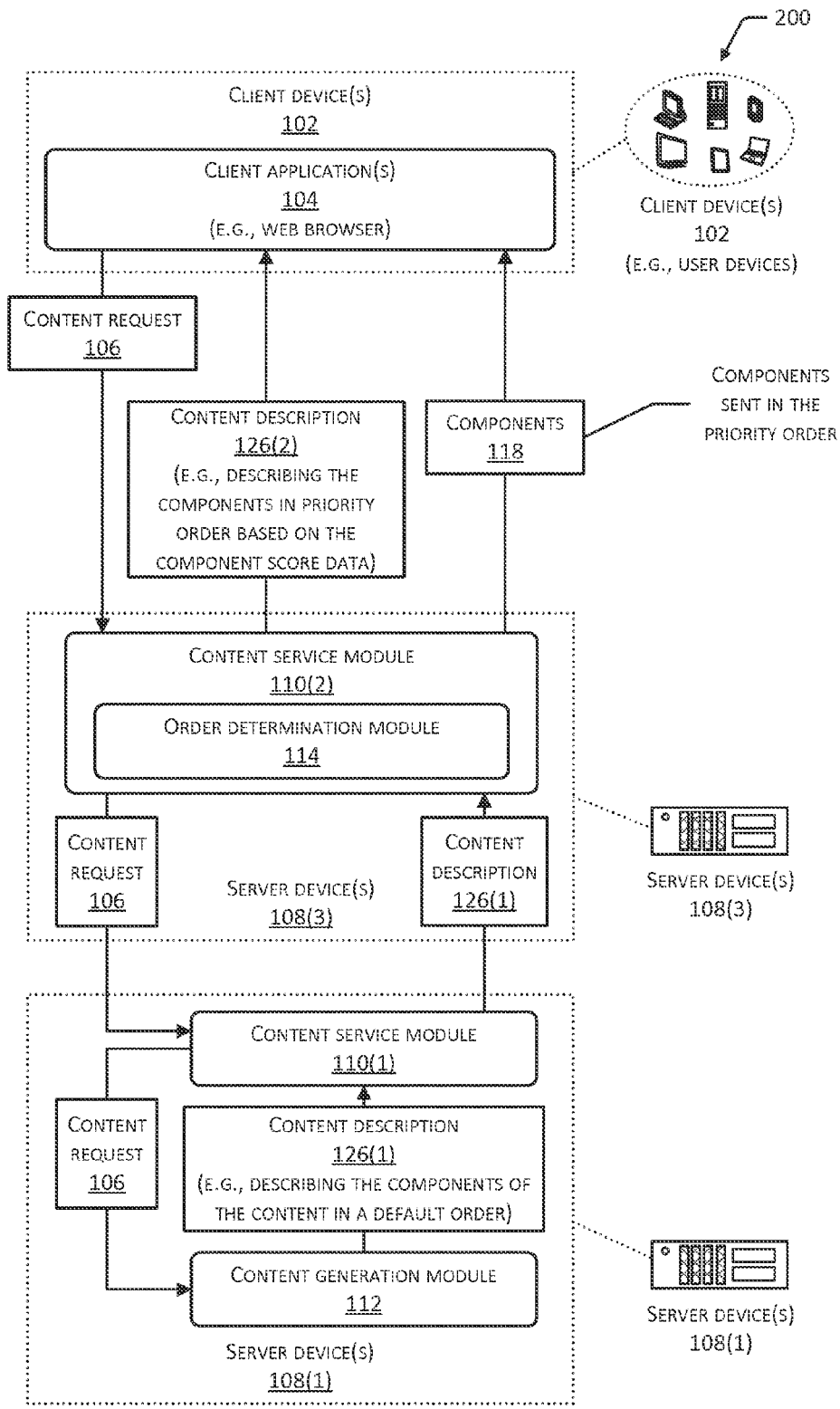
FIG. 2 depicts an environment including an intermediate server device for serving content to a client device, the content including a plurality of components that are communicated from the intermediate server device according to a priority order that is determined based on collected behavioral data.

FIG. 2 depicts an environment 200 including one or more server device(s) 108(1) and one or more server device(s) 108(3). In the example of FIG. 2, the server device(s) 108(1) may function as backend or content servers that generate dynamic or static content of the requested content 128, and the server device(s) 108(3) may function as intermediate, proxy, or edge servers that deliver the content 128 and its component(s) 118 to the client device(s) 102 according to the priority order. The elements shown in FIG. 2 may function similarly to the like-numbered elements depicted in FIG. 1.

In implementations illustrated by FIG. 2, the content request 106 may be generated by the client application(s) 104 (e.g., a web browser) executing on the client device(s) 102. The content request 106 may be sent to the server device(s) 108(3), which may include edge server devices, gateway server devices, load balancing devices, front end server devices, or any other type of server device that acts as an intermediary between the client device(s) 102 and the server device(s) 108(1) (e.g., the backend or content server devices). The server device(s) 108(1) and 108(3) may be physically separate devices. Alternatively, the server device(s) 108(1) and 108(3) may be logically separate virtual server environments (e.g., hypervisors, virtual machines, emulations, and so forth) running on a same set of one or more computing devices. In some cases, the server device(s) 108(3) may operate as a proxy server to perform server-side or client-side content retrieval, caching, and processing. For example, the server device(s) 108(3) may be proxy servers that support the operation of client application(s) 104 such as the Silk™ web browser provided by Amazon™, Inc. of Seattle, Wash., USA.

The server device(s) 108(3) may be server-side devices that are physically located closer to the server device(s) 108(1) than to the client device(s) 102, that are included in a same local area network as the server device(s) 108(1), or that are situated on the same side of a firewall or other security measures relative to the server device(s) 108(1). Alternatively, the server device(s) 108(3) may be client-side devices that are physically located closer to the client device(s) 102 than to the server device(s) 108(1), that are included in a same local area network as the client device(s) 102, or that are situated on the same side of a firewall or other security measures relative to the client device(s) 102.

The server device(s) 108(3) may execute a content service module 110(2), which may receive the content request 106 and send it to the content service module 110(1) executing on the server device(s) 108(1). As described with reference to FIG. 1, the content service module 110(1) may send the content request 106 to the content generation module 112, which performs operations to generate the content description 126(1) in response to the content request 106. The content generation module 112 may generate the content description 126(1) that describes the components 118 of the content 128 in a default order. In some cases, the default order may be according to an original design or layout for the content 128. Alternatively, the default order may be an arbitrary order or a substantially random order. The content description 126(1) may be sent to the content service module 110(2) executing on the server device(s) 108(3).

On receiving the content description 126(1), the content service module 110(2) may analyze the components 118 listed in the content description 126(1), and determine a priority order for communicating or presenting the components 118. In implementations illustrated by FIG. 2, the content service module 110(2) may include the order determination module 114. The order determination module 114 may access the component score data 120 and determine the priority order based on the scores for the components 118 of the content 128. In some implementations, the content service module 110(2) or the order determination module 114 may reorder or otherwise modify the content description 126(1) to generate a content description 126(2) that describes the components 118 in the priority order. The content description 126(2) may then be sent to the client application(s) 104, and the components 118 may be sent to the client application(s) 104 in the priority order as described with reference to FIG. 1. Accordingly, FIG. 2 illustrates implementations in which the determination and application of the priority order is performed by one or more intermediate, edge, or cache server device(s) 108(3) instead of by the one or more content or backend server device(s) 108(1) as shown in FIG. 1. Although not depicted in FIG. 2, the environment 200 may also include other components shown in FIG. 1 such as the server device(s) 108(2) and the content storage device(s) 116.

Figure 3:
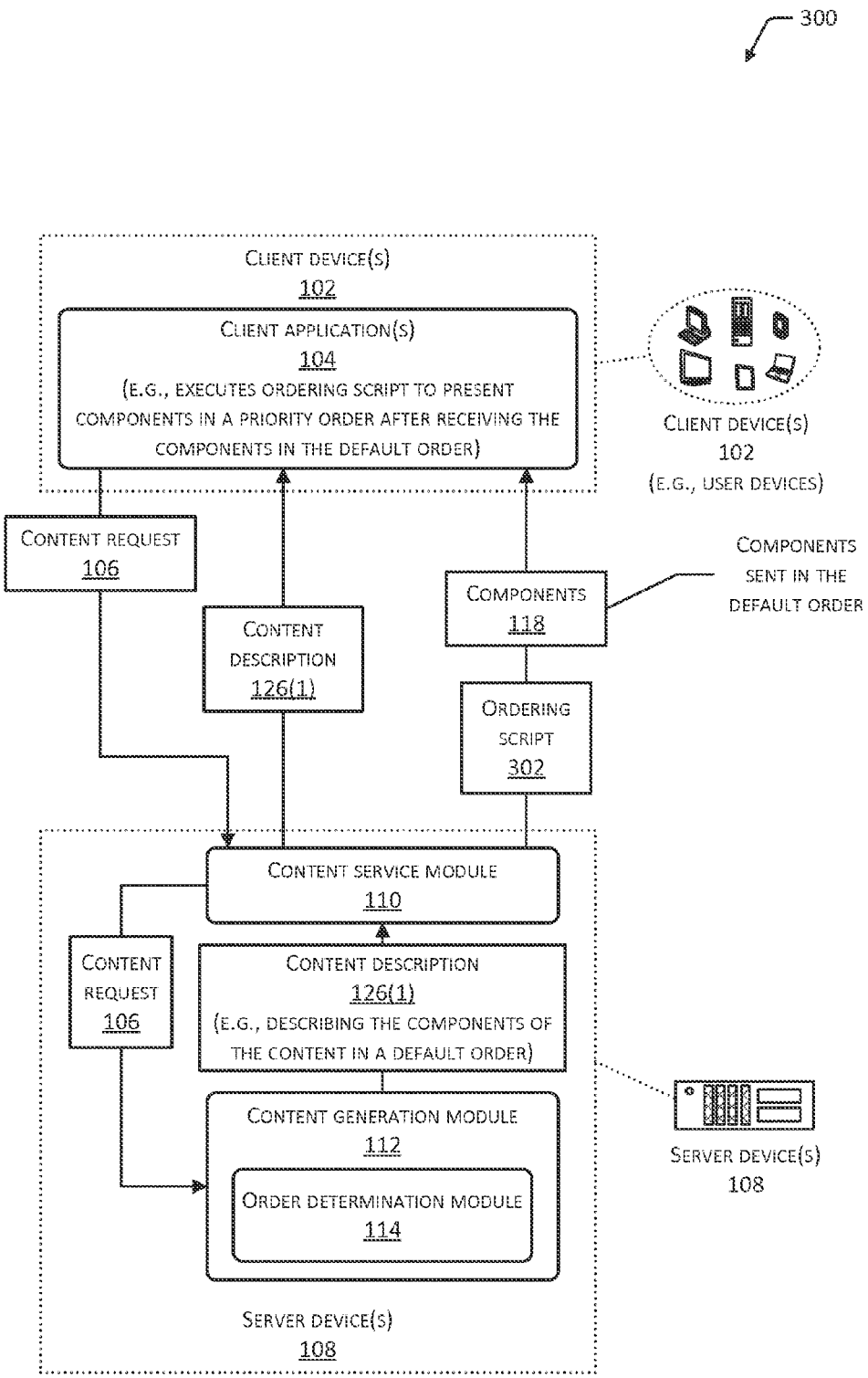
FIG. 3 depicts an environment including a server device for serving content to a client device, the content including a plurality of components that are communicated from the server device according to a default order, and presented on the client device in a priority order that is determined based on collected behavioral data.

FIG. 3 depicts an environment 300 including the server device(s) 108 that serve content to the client device(s) 102. The elements shown in FIG. 3 may function similarly to the like-numbered elements depicted in FIG. 1 or 2. In implementations illustrated by FIG. 3, the server device(s) 108 may receive the content request 106 and generate the content description 126(1). As described above with reference to FIG. 2, the content description 126(1) may describe the components 118 of the requested content 128 in a default order. The content service module 110 may receive the content description 126(1) from the content generation module 112, and may send the content description 126(1) to the client application(s) 104 executing on the client device(s) 102.

As described herein, the content generation module 112 or the order determination module 114 may determine the priority order for the components of the content 128 based at least partly on the component score data 120. In implementations illustrated by FIG. 3, the content generation module 112 or the order determination module 114 may generate an ordering script 302. The ordering script 302 may be executable within the client application(s) 104 to present the components 118 of the content 128 in the priority order. In some implementations, the ordering script 302 may be specified using an interpreted or scripting programming language such as JavaScript™ provided by Oracle™ Corporation of Redwood City, Calif., USA. Implementations also support the use of other languages to specify the ordering script 302. In some implementations, the content service module 110 may send to the client device(s) 102 the content description 126(1) describing the components 118 of the content 128 in a default order. The content service module 110 may also send to the client device(s) 102 the ordering script 302 and the components 118 of the content 128 in the default order. On receiving the components 118, the client application(s) 104 may cache or otherwise locally store the components 118. The client application(s) 104 may execute the ordering script 302 to render or otherwise present the components 118 in the priority order. Accordingly, FIG. 3 illustrates implementations in which the application of the priority order is performed by the client application(s) 104 to present the components 118 of the content 128 in the priority order, after receiving the components 118 in a default order that is different than the priority order. Although not depicted in FIG. 3, the environment 300 may also include other components shown in FIG. 1 such as the server device(s) 108(2) and the content storage device(s) 116. In some cases, the ordering script 302 may include one or more instructions that generate requests for the components 118 from one or more server devices 108. In such cases, the ordering script 302 may include one or more network locations (e.g., URIs) for the components 118.

Figure 4:
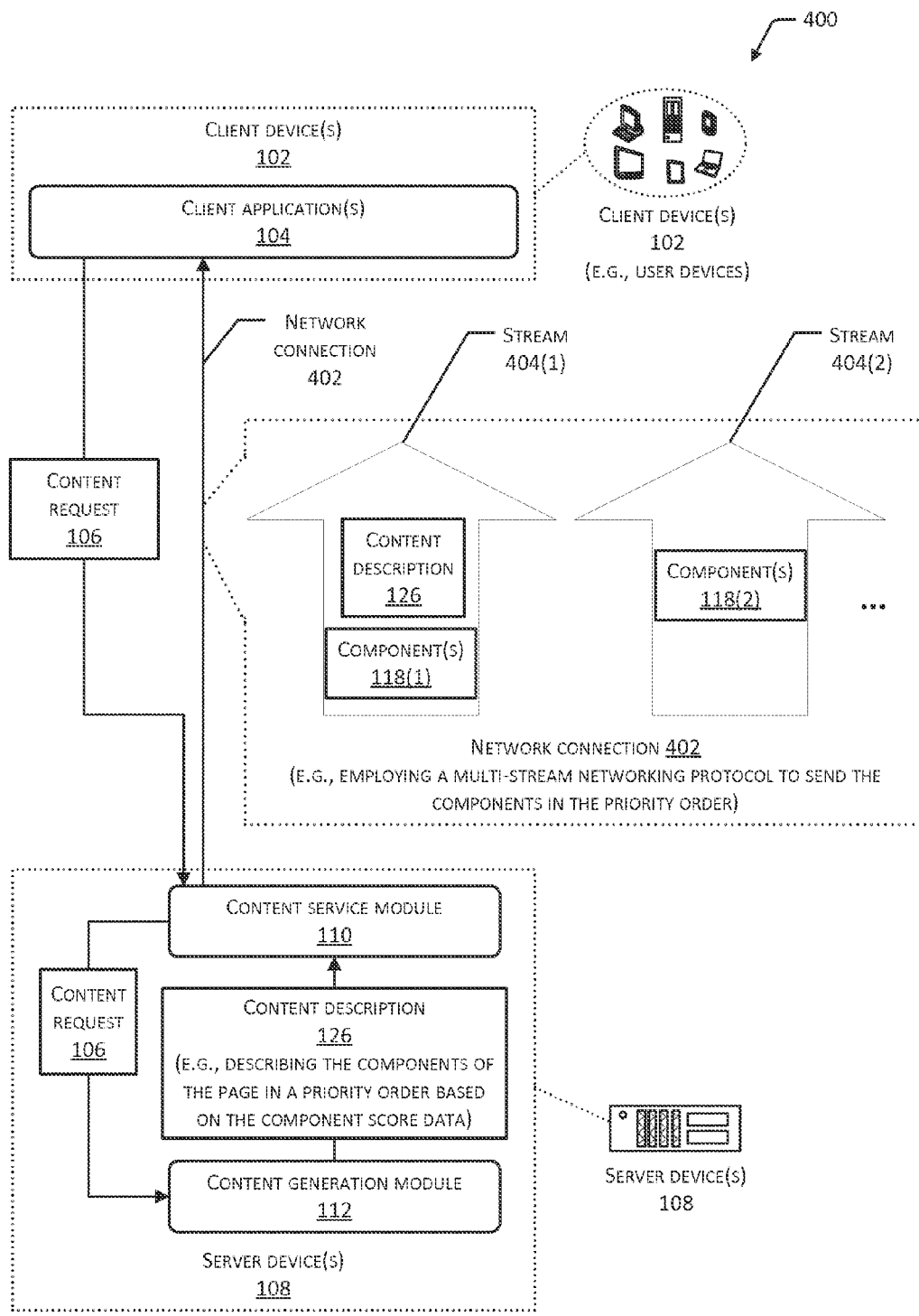
FIG. 4 depicts an environment including a content server device for serving content to a client device, the content including a plurality of components that are communicated using a multi-stream networking protocol according to a priority order that is determined based on collected behavioral data.

FIG. 4 depicts an environment 400 including the server device(s) 108 that serve content to the client device(s) 102. The elements shown in FIG. 4 may function similarly to the like-numbered elements depicted in FIGS. 1-3. Although not depicted in FIG. 4, the environment 400 may also include other components shown in FIG. 1 such as the server device(s) 108(2) and the content storage device(s) 116. In implementations illustrated by FIG. 4, server device(s) 108 may receive the content request 106 and generate the content description 126 that describes the components 118 of the requested content 128 in the priority order. The content service module 110 may receive the content description 126 from the content generation module 112, and may send the content description 126 to the client application(s) 104 executing on the client device(s) 102.

In implementations illustrated by FIG. 4, content delivery may be performed over a network connection 402 that employs a multi-stream networking protocol. Utilizing such a protocol, content may be delivered to the client device(s) 102 through the multiplexing of a plurality of data streams that carry the content. Such multiplexing may include the interleaving of data frames from a plurality of concurrent streams across a single channel or connection, e.g., across a single Transmission Control Protocol (TCP) connection. In some cases, the multiplexing may be time-based multiplexing, such that the data frames from the plurality of streams are interleaved in time. By multiplexing multiple streams, the multi-stream networking protocol may reduce latency in communications, and may efficiently deliver information such as web content over a single connection to the client device(s) 102. The multi-stream networking protocol may operate at the application layer, session layer, or any other layer of the Open Systems Interconnection (OSI) model. In some implementations the multi-stream networking protocol may be a version of SPDY™ developed primarily at Google® Inc. of Mountain View, Calif., USA. Implementations support the use of any multi-stream networking protocol that multiplexes frames from multiple streams, and that operates at any level of the OSI model.

As shown in FIG. 4, the network connection 402 employing the multi-stream networking protocol may include any number of streams 404 for communicating content of the content 128. In some implementations, different streams 404 may communicate the content description 126 and the components 118, and different streams 404 may communicate different sets of one or more of the components 118. In some cases, the streams 404 may be assigned priorities that indicate which streams 404 receive more bandwidth or capacity of the network connection 402. The priorities of the streams 404 may be indicated by information carried in each stream 404, such as header data included at the start of the stream 404. In some implementations, the components 118 may be communicated in streams 404 according to their priority. For example, one or more higher priority components 118 may be communicated in a higher priority stream 404 and one or more lower priority components 118 may be communicated in a lower priority stream 404. In some implementations, individual scores or ranges of scores may map to different streams 404. For example, in cases where the score ranges from 0 to 100, with 100 indicating a highest priority, a first stream 404(1) may communicate components 118 having scores from 81-100, a second stream 404(2) may communicate components 118 having scores from 61-80, and so forth. By employing higher priority streams 404 to communicate components 118 that are higher in the priority order, implementations may enable the higher priority components 118 to be presented in the client application(s) 104 prior to other components 118.

Implementations may employ any of the configurations illustrated in FIGS. 1-4 individually or in any combination. For example, in some cases, the environment in which implementations operate may include the server device(s) 108(1) and 108(3) as shown in FIG. 2 (e.g., separate content/backend servers and edge/intermediate servers) and may also employ the ordering script 302 as shown in FIG. 3 to enable client-side priority ordering for component presentation. As another example, the environment in which implementations operate may include the server device(s) 108(1) and 108(3) as shown in FIG. 2 (e.g., separate content/backend servers and edge/intermediate servers) and may also employ the network connection 402 with the multi-stream networking protocol to communicate the components 118 from the server device(s) 108(3) to the client device(s) 102, as shown in FIG. 4.

The various devices of the environments 100, 200, 300, and 400 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 200, 300, 400 may be encrypted or otherwise secured. For example, such communications may employ one or more public or private cryptographic keys, digital certificates, or other credentials supported by a security protocol such as any version of the SSL or the TLS protocol. Moreover, in some implementations communications between two or more of the devices in the environments 100, 200, 300, or 400 may employ a multichannel, multiplexed communication protocol such as SPDY™ provided by Google™, Inc.

FIG. 5 depicts a schematic 500 showing a non-limiting example of the behavioral data 122 that may be employed to determine the component score data 120 and the priority order. The behavioral data 122 may be collected on any number of client device(s) 102, and may describe user interactions with components 118 previously presented on the client device(s) 102. Alternatively, the behavioral data 122 may describe user interactions with components 118 of content being currently presented on the client device(s) 102. In some cases, the behavioral data 122 may be collected through client application(s) 104 (e.g., web browsers) that are instrumented or otherwise modified to collect the behavioral data 122 during browsing sessions, and send the behavioral data to the server device(s) 108(2) or to other devices accessible to the server device(s) 108(2). To ensure privacy of user-specific data, the collection of the behavioral data 122 on client device(s) 102 (e.g., user devices) may be contingent on receiving a user's permission to collect, store, and process such data. In some cases, the permission may be provided as an opt in, such that the user data is not collected without a user's explicit permission. Alternatively, the permission may be provided as an opt out, such that the user data may be collected until the user requests otherwise.

As shown in the example of FIG. 5, the behavioral data 122 may include dwell time data 502. The dwell time data 502 may describe dwell times during which component(s) 118 are presented within a viewable portion of a display on the client device(s) 102. For example, a dwell time may be a time period during which the user has scrolled down to display a portion of content that includes a component 118. Accordingly, dwell time may be based on scrolling position with a web browser or other client application 104. Dwell time may also be based on a detected cursor or mouse position within presented content. In some cases, dwell time may be determined based on tracking the direction in which a user's eyes are looking, such as in controlled test environments that employ eye tracking technology or in a user device that employs eye tracking to move a cursor or manipulate user interface controls. In some cases, longer dwell times for a component 118 may lead to a higher score for the component 118, or a score that otherwise specifies a higher priority for presentation of the component 118.

The behavioral data 122 may include presentation count data 504. The presentation count data 504 may describe a number of presentations of a component 118, or a frequency of presentation (e.g., the number of presentations during a time period) of the component 118, within the viewable portion of the display on the client device(s) 102. In some cases, a higher number or higher frequency of presentations of a component 118 may lead to a higher score for that component 118, or a score that otherwise specifies a higher priority for presentation of the component 118.

In some implementations, the behavioral data 122 may include transaction data 506. The transaction data 506 may describe interactions with components 118 during browsing sessions which resulted in completed transactions through presented content. In cases where the content is part of an online store or electronic commerce web site, the completed transactions may include sales, rentals, or other transactions which generate revenue or value for owners or operators of the web site. In some cases, a component 118 for which interactions are correlated or otherwise associated with completed transactions may be assigned a higher score, or a score that otherwise specifies a higher priority for presentation of the component 118.

The behavioral data 122 may also include browsing history data 508 for one or more users. The browsing history data 508 may describe previous sessions during which one or more users interacted with content, such as web pages included in one or more web sites. In some cases, a score for a component 118 may be particular to an individual user or a group of users such as a user segment. A user segment may include any number of users who have displayed substantially similar behavior regarding their browsing history, purchase history, activities, demonstrated interests, and so forth. A user segment may also include any number of users who are substantially similar with regard to location, demographics, language group, and so forth. A component 118 may be scored higher for a user segment if it is determined that it may be of particular interest to that user segment. For example, a component 118 that is an image of an electronics product may be assigned a score that specifies a high priority for presentation to members of a user segment who have previously purchased or browsed similar electronics products. In some cases, the browsing history data 508 may include clickstream data describing one or more actions performed by users while browsing the content, such as mouse clicks, scroll events, selections within controls, navigations using links or controls, or other actions.

The behavioral data 122 may also include user segment data 510 that describes one or more sets, groups, or collections of users in one or more user segments. Implementations are not limited to the above examples of behavioral data 122, and implementations may employ other data 512 to determine scores and priority ordering for components 118.

Figure 6:
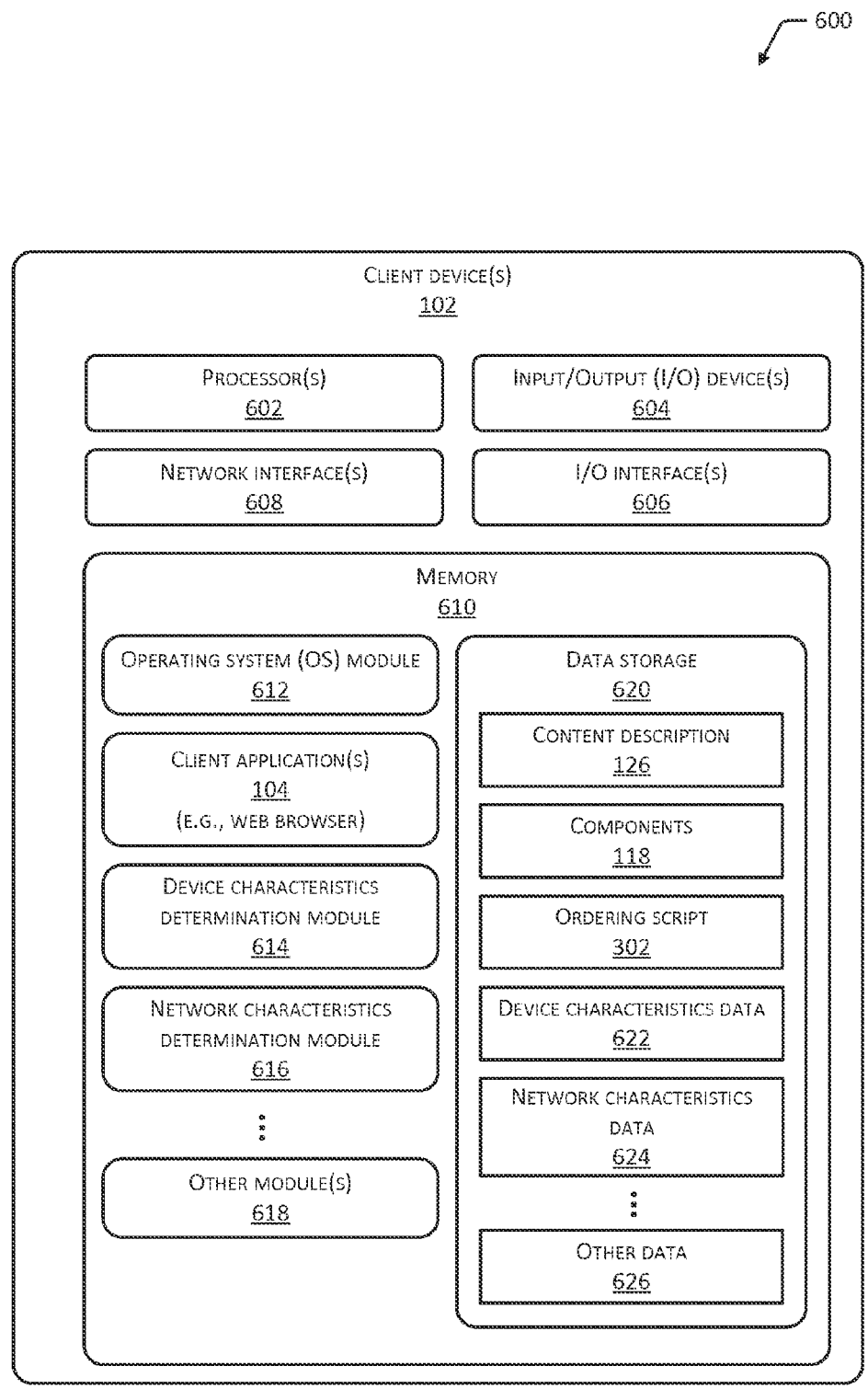
FIG. 6 depicts a block diagram of an example client device on which content may be presented.

FIG. 6 depicts a block diagram 600 of an example of the client device(s) 102. As shown in the block diagram 600, the client device 102 may include one or more processors 602 configured to execute one or more stored instructions. The processor(s) 602 may comprise one or more cores.

The client device 102 may include one or more input/output (I/O) devices 604. The I/O device(s) 604 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 604 may also include output devices such as a display, an audio output device (e.g., a speaker), a printer, a haptic output device, and so forth. The I/O device(s) 604 may be physically incorporated with the client device 102, or may be externally placed.

The client device 102 may include one or more I/O interfaces 606 to enable components or modules of the client device 102 to control, interface with, or otherwise communicate with the I/O device(s) 604. The I/O interface(s) 606 may enable information to be transferred in or out of the client device 102, or between components of the client device 102, through serial communication, parallel communication, or other types of communication. For example, the I/O interface(s) 606 may comply with a version of the RS-232 standard for serial ports, or with a version of the Institute of Electrical and Electronics Engineers (IEEE) 1284 standard for parallel ports. As another example, the I/O interface(s) 606 may be configured to provide a connection over Universal Serial Bus (USB) or Ethernet. In some cases, the I/O interface(s) 606 may be configured to provide a serial connection that is compliant with a version of the IEEE 1394 standard. The client device 102 may also include one or more busses or other internal communications hardware or software that allow for the transfer of data between the various modules and components of the client device 102.

The client device 102 may include one or more network interfaces 608 that enable communications between the client device 102 and other network accessible computing devices such as the server device(s) 108. The network interface(s) 608 may include one or more network interface controllers (NICs) or other types of transceiver devices configured to send and receive communications over a network.

The client device 102 may include one or more memories, described herein as memory 610. The memory 610 comprises one or more computer-readable storage media (CRSM). The CRSM may include one or more of an electronic storage medium, a magnetic storage medium, an optical storage medium, a quantum storage medium, a mechanical computer storage medium, and so forth. The memory 610 provides storage of computer-readable instructions that may describe data structures, program modules, processes, applications, or other data for the operation of the client device 102. In some implementations, the memory 610 may provide storage of computer-readable instructions or other information in a non-transitory format.

The memory 610 may include an operating system (OS) module 612. The OS module 612 may be configured to manage hardware resources such as the I/O device(s) 604, the I/O interface(s) 606, and the network interface(s) 608, and to provide various services to applications, processes, or modules executing on the processor(s) 602. The OS module 612 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion' Ltd. of Waterloo, Ontario, Canada; any version of VxWorks™ from Wind River Systems™ of Alameda, Calif., USA; or other operating systems.

The memory 610 may include one or more of the modules described above as executing on the client device 102, such as the client application(s) 104. In some implementations, device characteristics, network characteristics, or other information may be employed in addition to the behavioral data 122 to determine a priority order for presenting the components 118 on the client device 102, or to determine a subset of the component(s) 118 to present. In such cases, the memory 610 may include a device characteristics determination module 614 to determine characteristics of the client device 102, such as the size of a display, the amount of memory or processing capacity currently used or available, and so forth. The memory 610 may also include a network characteristics determination module 616 to determine characteristics of a network connection being employed to communicate the components 118 to the client device 102. Such network characteristics may include speed, bandwidth, type, active time, or other characteristics of the network. The memory 610 may also include one or more other modules 618, such as a user authentication module or an access control module to secure access to the client device 102, and so forth.

The memory 610 may include data storage 620 to store data for operations of the client device 102. The data storage 620 may comprise a database, array, structured list, tree, or other data structure, and may be a relational or a non-relational datastore. The data storage 620 may store data such as that described above as being stored on or employed by the client device 102, including one or more of the content description 126, the components 118, or the ordering script 302. In some implementations, the data storage 620 may store device characteristics data 622 and network characteristics data 624 respectively collected by the device characteristics determination module 614 and the network characteristics determination module 616 as described above. The data storage 620 may also store other data 626, such as user authentication information or access control data. In some implementations, at least a portion of the information stored in the data storage 620 may be stored externally to the client device 102, on other devices that may communicate with the client device 102 via the I/O interface(s) 606 or via the network interface(s) 608.

Figure 7:
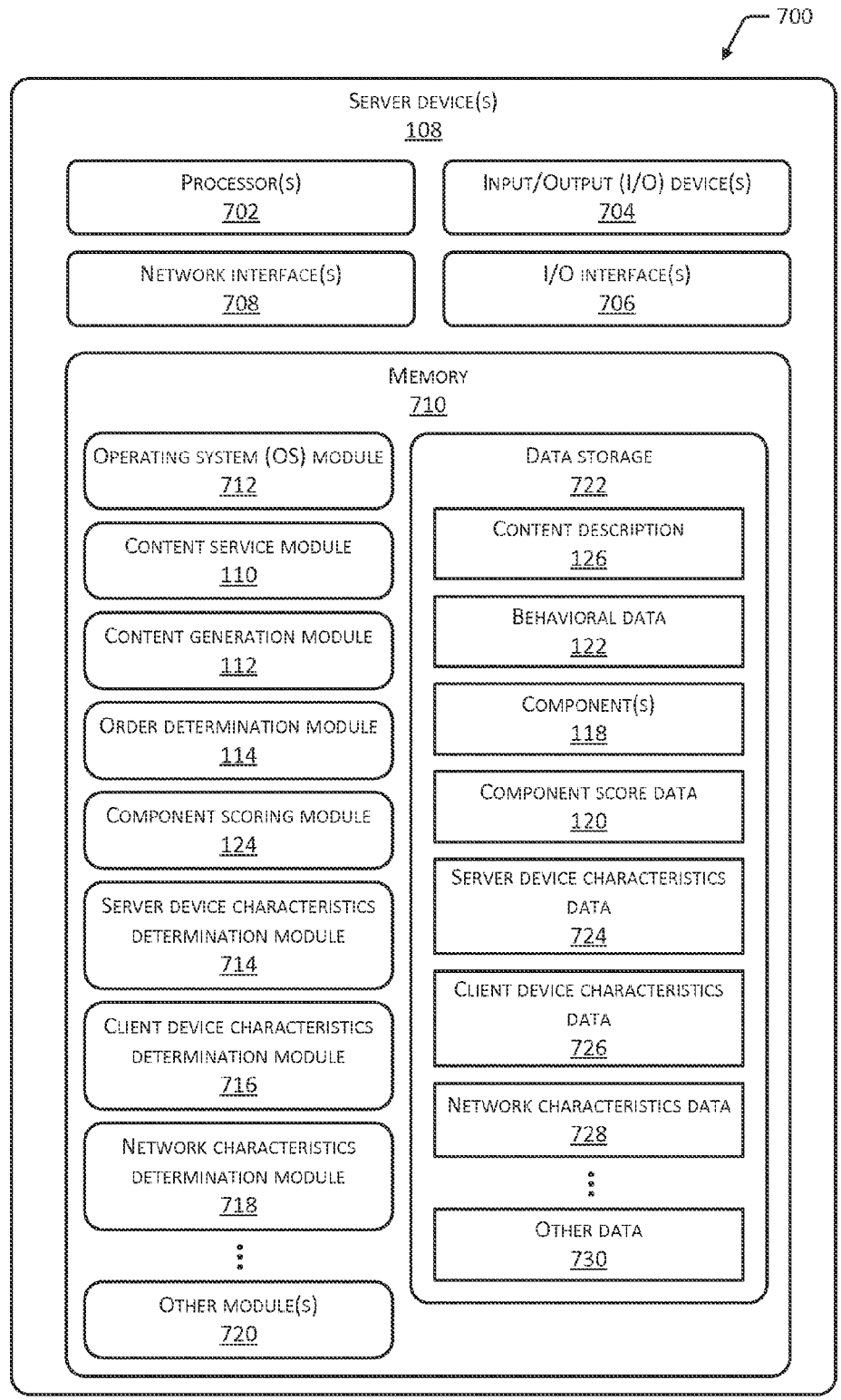
FIG. 7 depicts a block diagram of an example server device configured to serve content including a plurality of components.

FIG. 7 depicts a block diagram 700 of an example of the server device(s) 108. As shown in the block diagram 700, the server device 108 may include one or more processors 702 configured to execute one or more stored instructions. The processor(s) 702 may comprise one or more cores. The server device 108 may include one or more I/O devices 704, one or more I/O interfaces 706, and one or more network interfaces 708 as described above respectively with reference to the I/O device(s) 604, the I/O interface(s) 606, and the network interface(s) 608.

The server device 108 may include one or more memories, described herein as memory 710. The memory 710 comprises one or more CRSM, as described above with reference to the memory 610. The memory 710 may include an OS module 712 that is configured to manage hardware resources such as the I/O device(s) 704, the I/O interface(s) 706, and the network interface(s) 708, and to provide various services to applications, processes, or modules executing on the processor(s) 702. The OS module 712 may include one or more of the operating systems described above with reference to the OS module 612. The memory 710 may include one or more of the modules described above as executing on the server device 108, such as the content service module 110, the content generation module 112, the order determination module 114, or the component scoring module 124.

Figure 11:
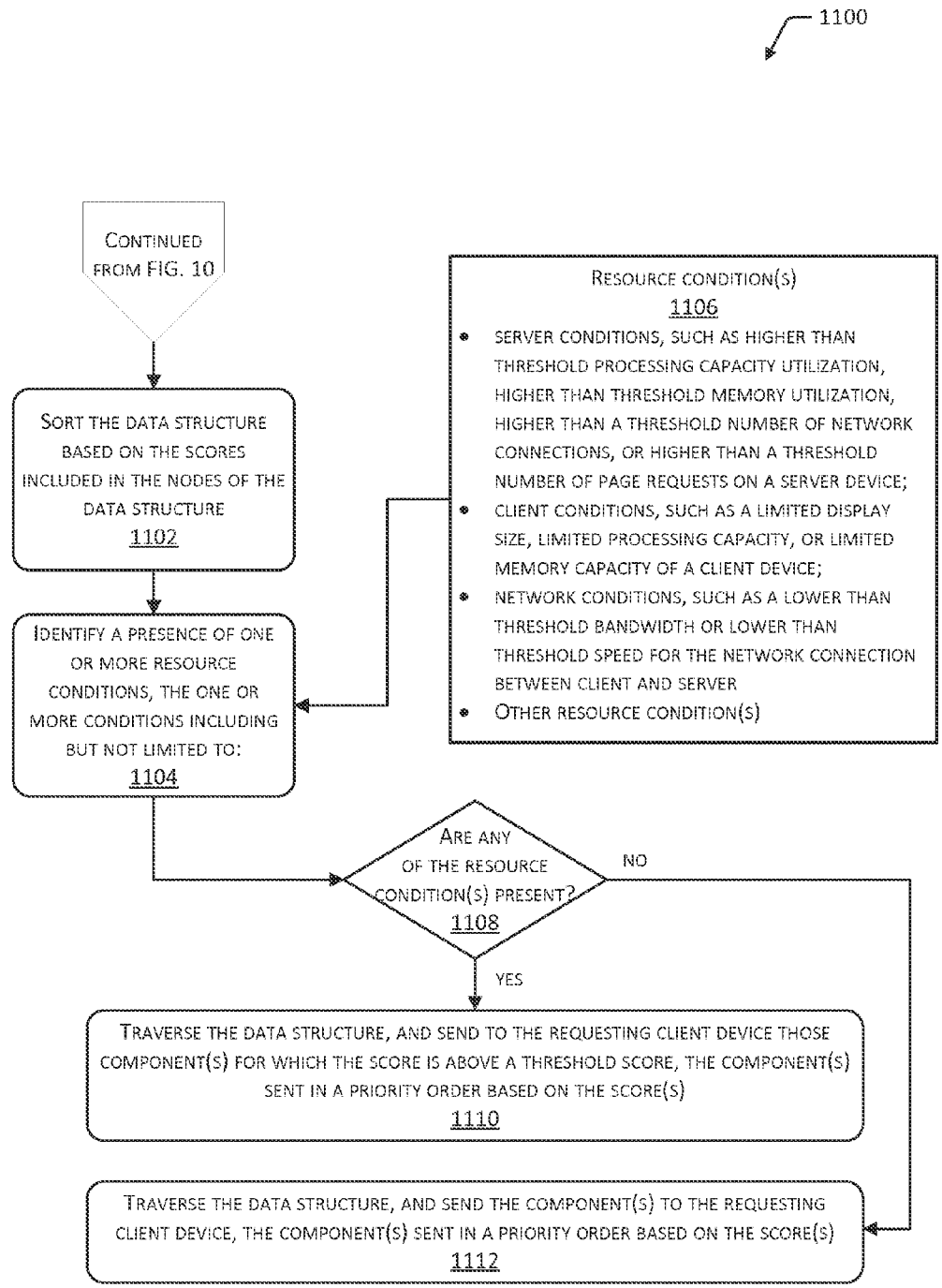
FIG. 11 depicts a flow diagram of a process for determining a priority order for communicating or presenting a plurality of components of content, and communicating the plurality of components.

In some implementations, server device characteristics, client device characteristics, network characteristics, or other information may be employed in addition to the behavioral data 122 to determine the priority order, or to determine a subset of the component(s) 118 to generate and send to the client device(s) 102. In such cases, the memory 710 may include a server device characteristics determination module 714 to determine characteristics or operating conditions of the server device 108, such as the amount of memory or processing capacity currently used or available, a number of current network connections, a number of content requests 106 currently being processed, and so forth. The memory 710 may include a client device characteristics determination module 716 to determine characteristics or operating conditions of the client device 102, such as a display size, memory or storage capacity, processing capacity, and so forth. The memory 710 may also include a network characteristics determination module 718 to determine characteristics of a network connection being employed to communicate the components 118 to the client device 102. Such network characteristics may include speed, bandwidth, type, active time, latency, or other characteristics of the network. FIG. 11 describes implementations in which device characteristics or network characteristics are employed when determining which components 118 to send to the client device 102. The memory 710 may also include one or more other modules 720, such as a user authentication module or an access control module to secure access to the server device 108, and so forth.

The memory 710 may include data storage 722 to store data for operations of the server device 108. The data storage 722 may comprise a database, array, structured list, tree, or other data structure, and may be a relational or a non-relational datastore. The data storage 722 may store data such as that described above, including one or more of the content description 126, the behavioral data 122, the component(s) 118, and the component score data 120. The data storage 722 may also include server device characteristics data 724, client device characteristics data 726, and network characteristics data 728 respectively generated by the server device characteristics determination module 714, the client device characteristics determination module 716, and the network characteristics determination module 718 as described above. The data storage 722 may also store other data 730, such as user authentication information or access control data. In some implementations, at least a portion of the information stored in the data storage 722 may be stored externally to the server device 108, on other devices that may communicate with the server device 108 via the I/O interface(s) 706 or via the network interface(s) 708.

Figure 8:
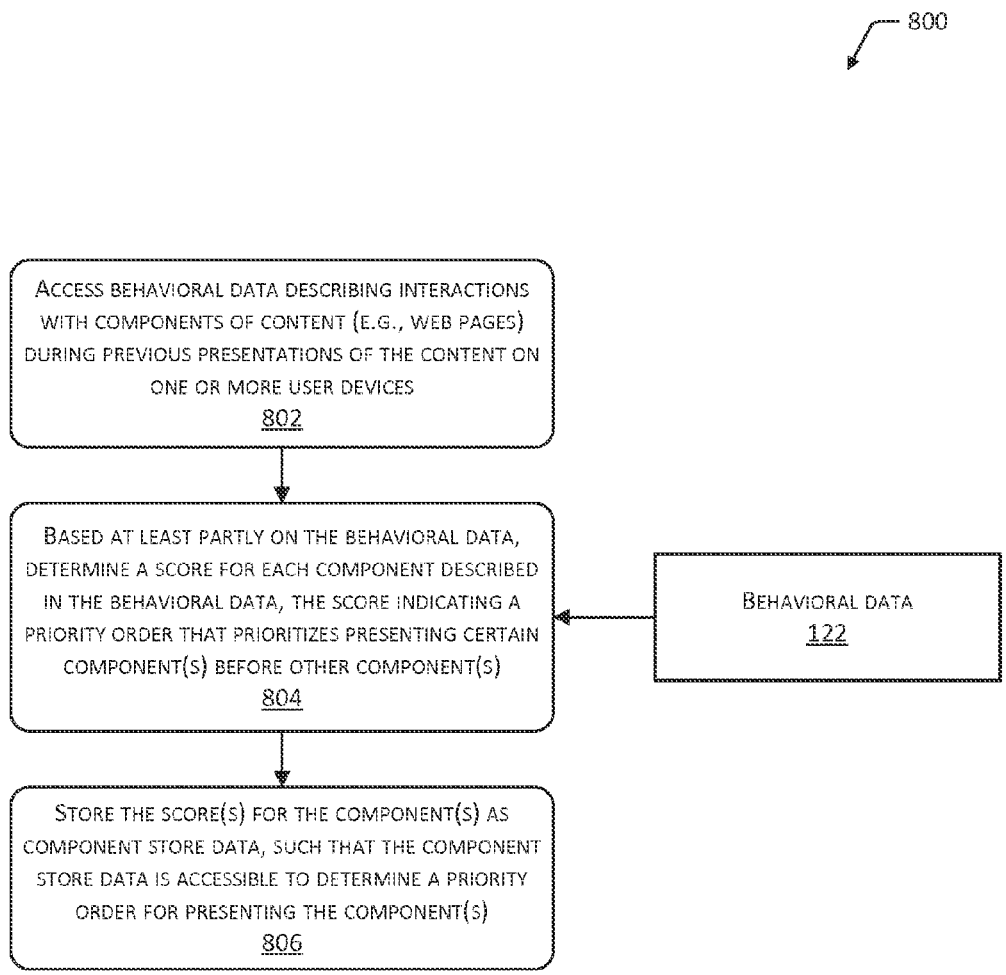
FIG. 8 depicts a flow diagram of a process for determining a score for each of one or more components of content, the score(s) determined based on collected behavioral data.

FIG. 8 depicts a flow diagram 800 of a process for determining a score for each of one or more components 118, the score(s) determined based on the collected behavioral data 122. One or more operations of the process may be performed by the component scoring module 124, other modules executing on the server device(s) 108, or other modules executing on other devices.

At 802, the behavioral data 122 may be accessed. As described above, the behavioral data 122 may describe the interactions with one or more components 118 during previous presentations of content on one or more client devices 102 (e.g., user devices).

At 804, a score may be determined for each of one or more of the components 118 described in the behavioral data 122. As described herein, the score for a component 118 may indicate a priority order for generating the component 118, for sending the component 118 to the requesting client device 102, or for presenting the component 118 on the client device 102. Accordingly, a particular score for a component 118 may indicate that the component 118 is to be generated, sent, or presented prior to one or more other components 118 or after one or more other components 118. As described above with reference to FIG. 5, the score may be based on the behavioral data 122, such as one or more of the dwell time data 502, the presentation count data 504, the transaction data 506, the browsing history data 508, the user segment data 510, or other data 512.

In some implementations, the determination of the score for a component 118 may be further based on the particular content or type of content presented in the content 128 or presented by the component 118. For example, in a web page that is part of an online store, content related to products (e.g., product description, image, price, reviews, and so forth) may be scored higher than other types of content. As another example, on a product page a primary image of the product may be scored higher than other images of the product, to ensure that the primary image is rendered prior to the other images. Moreover, in some cases the score may be based at least partly on user specified (e.g., manually requested) score information, such that the score prioritizes the presentation of component(s) 118 based on user specifications. For example, a marketing specialist or product manager may request that a particular component 118 related to a product be scored higher based on business goals, marketing goals, or for other reasons. In some implementations, the scores for the components 118 may be further based on business objectives related to the components 118. For example, one or more components 118 comprising an advertisement may be scored such that the component(s) 118 are presented with a higher priority, based on a determination to present the advertisement with a predetermined frequency on one or more web pages.

As described above, the score for a component 118 may be determined with respect to a general population of users. Alternatively, the score for a component 118 may be determined with respect to an individual user or user segment. For example, a component 118 may have a first score with respect to a first user segment, and a second score with respect to a second user segment, such that the presentation of the component 118 is prioritized differently depending on the user segment associated with the user who generated the content request 106 requesting the content 128.

At 806, the one or more scores determined for one or more components 118 may be stored as the component store data 120. The component store data 120 may then be accessed by the order determination module 114 or other modules to determine a priority order for generating, communicating, or presenting the components 118 of the content 128.

Figure 9:
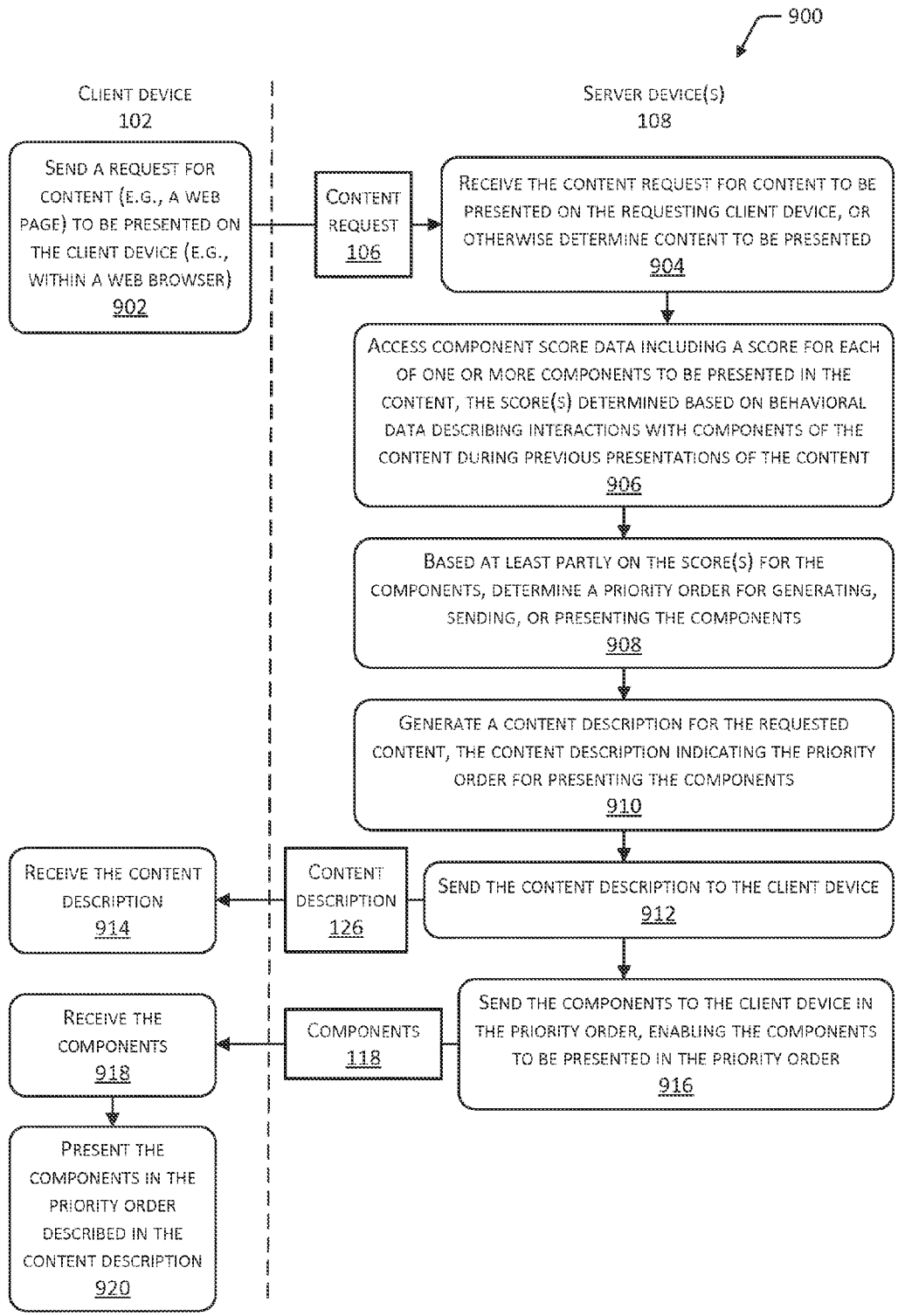
FIG. 9 depicts a flow diagram of a process for communicating a content description and a plurality of components of requested content, the plurality of components communicated in a priority order that is based at least partly on component scores.

FIG. 9 depicts a flow diagram 900 of a process for communicating the content description 126 and a plurality of components 118 for the requested content 128, the plurality of components 118 communicated in a priority order that is determined based at least partly on the component score data 120. One or more operations of the process may be performed by the client application(s) 104, other modules executing on the client device(s) 102, the content service module 110, the content generation module 112, the order determination module 114, other modules executing on the server device(s) 108, or other modules executing on other devices.

At 902, the content request 106 is sent from the client device 102 to the server device(s) 108. As described above, in cases where the content request 106 is for a web page, the content request 106 may have been generated by a user of the client device 102 entering a URI into the navigation bar of a client application 104 (e.g., a web browser). In such cases, the content request 106 may be a HTTP request, a HTTPS request, or another type of request that includes the URI of the requested content 128.

At 904, the content request 106 is received at the server device(s) 108. Based on the URI included in the content request 106, or based on other information, the requested content 128 may be determined. The one or more components 118 to be presented in the content 128 may also be determined. In some cases, this determination is based on traversing or otherwise analyzing the DOM for the requested content 128, or based on other information that describes the component(s) 118 to be presented in the content 128.

At 906, the component score data 120 is accessed. In some cases, the component score data 120 may have been previously generated and stored as described with reference to FIG. 8.

At 908, based at least partly on the score for one or more of the components 118 of the requested content 128, the score(s) described in the component score data 120, a priority order may be determined for generating the component(s) 118, sending the component(s) 118 to the requesting client device 102, or presenting the component(s) 118 on the requesting client device 102. Determination of the priority order is described further with reference to FIGS. 10 and 11.

At 910, the content description 126 is generated for the requested content 128. In some implementations, the content description 126 may describe the components 118 of the content 128 in the priority order determined based on the component score data 120. At 912, the content description 126 is sent to the requesting client device 102. Alternatively, as described above with reference to FIG. 2, server device(s) 108(1) may generate the content description 126(1) that includes a default order of the components 118, and the server device(s) 108(3) may then apply the priority order to reorder the description of the components 118 in the content description 126(2) which is then sent to the requesting client device 102. At 914, the requesting client device 102 receives the content description 126.

At 916, the components 118 of the content 128 may be sent to the requesting client device 102 in the priority order. As described above, in some cases, the components 118 may be sent in response to requests for the components 118 sent to the server device(s) 108 from the requesting client device 102, where such requests may be sent from the requesting client device 102 in the priority order. Alternatively, the components 118 may be sent to the requesting client device 102 not in response to a particular request for the components 118. At 918, the components 118 are received by the requesting client device 102. At 920, the components 118 may be presented within the client application(s) 104 on the requesting client device 102. The components 118 may be presented in an order in which they are received at the client device 102. In some cases, the order for presenting the components 118 may correspond to the priority order described in the content description 126, as described above. Alternatively, the client application(s) 104 or the client device 102 may determine to present the component 118 in an order that is different than the priority order, based on resource constraints or other operating conditions on the client device 102.

Figure 10:
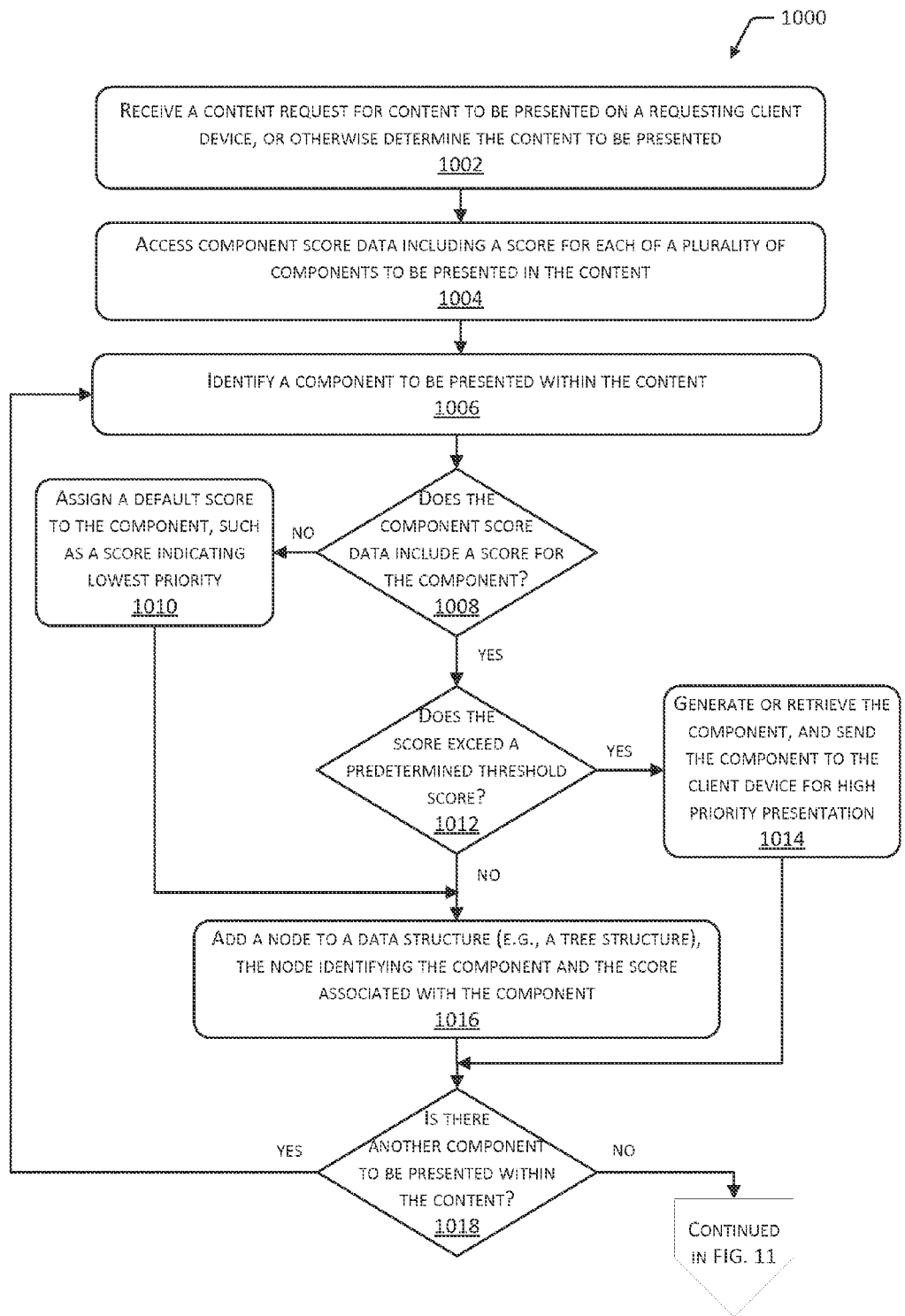
FIG. 10 depicts a flow diagram of a process for determining a priority order for communicating or presenting a plurality of components of content.

FIG. 10 depicts a flow diagram 1000 of a process for determining a priority order for generating, communicating, or presenting a plurality of components 118 of the content 128. One or more operations of the process may be performed by the content service module 110, the content generation module 112, the order determination module 114, other modules executing on the server device(s) 108, or other modules executing on other devices.

At 1002, the content request 106 may be received, as described above with reference to 902. At 1004, the component score data 120 is accessed. As described above, the component score data 120 may include a score for each of a plurality of components 118 to be presented in the requested content 128.

At 1006, a component 118 is identified to be presented within the requested content 128, as described above with reference to 904. At 1008, a determination is made whether the component score data 120 includes a score for the component 118. If not, the process may proceed to 1010 and assign a default score to the component 118. In some cases, the default score may be a score indicating a lowest priority for generating, sending, or presenting the component 118. For example, in cases where the scores range from 0 to 100, with zero indicating a lowest priority, the default score may be 0. After assigning a default score at 1010, the process may proceed to 1016. If it is determined at 1008 that there is a score for the component 118 in the component score data 120, the process may proceed to 1012.

In some implementations, one or more high priority components 118 may be designated for substantially immediate or expedited generation or communication. In such cases, at 1012 a determination may be made whether the score for the component 118 exceeds a predetermined threshold score. For example, in cases where the scores range from 0 to 100, with zero indicating a lowest priority, the threshold score may be 90. If the score exceeds the threshold score, the process may proceed to 1014. At 1014, one or more operations may be launched to generate the component 118. In some cases, the component 118 may be sent to the client device 102 as soon as the component 118 is available, to ensure expedited presentation of the component 118 on the requesting client device 102. After 1014, the process may proceed to 1018. If it is determined at 1012 that the score does not exceed the predetermined threshold score, the process may proceed to 1016.

In some implementations, a data structure may be instantiated in memory on the server device(s) 108 and employed during the generation and communication of the components 118 for the requested content 128. In some cases, the data structure may be a tree data structure such as a binary tree or n-branching tree (e.g., exhibiting a branching factor of n). Implementations also support the use of other types of data structures to generate and communication the components 118, such as lists, hash tables, and so forth. The data structure may include a plurality of nodes. Each of the nodes may identify a component 118 of the content 128, and may include a parameter indicating the score associated with the component 118. At 1016, a node may be added to the data structure, the node identifying the component 118 determined at 1006. The node may also include the score determined at 1008 or 1010. In some implementations, the data structure may be generated according the scores for the components 118. For example, the in cases where the data structure is a hash table or a tree, the data structure may be ordered according to the scores.

At 1018, a determination is made whether there is at least one other component 118 to be presented within the requested content 128. If so, the process may return to 1006 and identify another component 118. If not, the process may continue as described with reference to FIG. 11.

FIG. 11 depicts a flow diagram 1100 of a process for determining a priority order for generating, communicating, or presenting a plurality of components 118 of the content 128, and communicating the plurality of components 118. One or more operations of the process may be performed by the content service module 110, the content generation module 112, the order determination module 114, other modules executing on the server device(s) 108, or other modules executing on other devices.

At 1102, in some implementations the data structure may be sorted according to the scores for the components 118 described in the nodes of the data structure. The sorted data structure may then be traversed in priority order according to the scores of the components 118. Alternatively, in some implementations the data structure may not be sorted and the traversal of the data structure (e.g., as described with reference to 1108) may select and remove nodes from locations in the unsorted data structure. Moreover, in some implementations the data structure may be first generated to include all the components 118 of the content 128, and may then be modified to incorporate a score into one or more nodes corresponding to one or more components 118. As described above, in some cases the data structure may be generated in an order according to the scores of the components 118. In such cases, 1102 may be omitted.

In some implementations, based on certain operating conditions being present, based on device characteristics, or based on other criteria a subset of the components 118 for the content 128 may be generated and sent to the client device 102. In such cases, at 1104 a presence of one or more resource conditions 1106 is identified. The resource conditions 1106 may include server conditions, such as a higher than threshold processing capacity utilization on the server device 108, a higher than threshold memory or storage utilization on the server device 108, a higher than threshold number of network connections open to the server device 108, or a higher than threshold number of content requests 106 being received at the server device 108. For example, in situations where the processing or memory capacity of the server device 108 is limited, or when the server device 108 is receiving a large number of content requests (e.g., more than a threshold number of requests), a subset of the components 118 may be generated and sent to the client device 102 to conserve resources and ensure that at least a minimally usable portion of content is presented on the client device 102.

The resource conditions 1106 may also include client conditions, such as whether the requesting client device 102 has a limited display size, a limited processing capacity, or a limited memory capacity. For example, in cases where the client device 102 is a mobile device with a small display, a subset of the components 118 may be generated and sent to the client device 102 to optimize presentation of the content 128 in the small display.

The resource conditions 1106 may also include network conditions, such as whether the network connection between the client device 102 and the server device(s) 108 is exhibiting a lower than threshold bandwidth or is exhibiting a lower than threshold speed. For example, in cases where the client device 102 is communicating with the server device(s) 108 over a network connection having limited bandwidth or speed (e.g., a 3G network), a subset of the components 118 may be generated and sent to the client device 102 to optimize presentation of the content 128 while the client device 102 is experiencing limited network connectivity. The resource conditions 1106 are not limited to the examples described above, and may include other conditions. The resource conditions 1106 may be determined based on one or more of the device characteristics data 622, the network characteristics data 624, the server device characteristics data 724, the client device characteristics data 726, the network characteristics data 728, or other information.

In some cases, the criteria for determining a subset of the components 118 to send may be further based on the resources that may be expended to generate or communicate the component(s) 118. For example, when a network connection between the client device 102 and the server device 108 has a limited bandwidth or capacity, the size of the component(s) 118 may be taken into account when deciding which of the components 118 to send to the client device 102. As another example, when the server device 108 is experiencing a high load (e.g., a high utilization of processing capacity), the determination of which components 118 to generate and send may be further based on an amount of processing capacity that may be expended to generate the components 118.

At 1108, a determination is made whether one or more of the resource conditions 1106 are present. If so, the process may proceed to 1110. If not, the process may proceed to 1112.

At 1110, the data structure may be traversed. For each node that includes a score higher than a predetermined threshold score, the corresponding component 118 may be generated (e.g., for a dynamic component) or retrieved (e.g., for a static component) and sent to the requesting client device 102. At 1112, the data structure may be traversed and each of the components 118 may be generated and sent to the requesting client device 102. Accordingly, the processing at 1110 provides for the generation and communication of those components 118 having a score higher than the predetermined threshold score, and the processing at 1112 may provide for the generation and communication of all the components 118 included in the data structure. In either case at 1110 or 1112, the components 118 may be generated and sent according to the priority order indicated by the scores of the components 118. As the data structure is traversed, one or more nodes may be selected such that the associated component 118 is generated and sent to the client device 102. As each node is selected, that node may be removed from the data structure.

In some implementations, the priority order may be modified based on additional criteria. In some cases the priority order for one or more components 118 may be adjusted based on characteristics of the component(s) 118, such as size, file type, the time to generate or retrieve the component(s) 118, and so forth. For example, in cases where a component 118 is of a large size such that it is expected to take a significant amount of time (e.g., more than a predetermined threshold amount of time) to generate, the priority order may be adjusted to specify a higher priority for that component 118 and thus allow sufficient time to generate, communicate, and present the component 118. Alternatively, in cases where a component 118 is large such that it is expected to take a significant amount of time to generate, the priority order may be adjusted to specify a lower priority for that component 118. In such cases, lowering the priority of the component 118 may ensure that the generation, communication, or presentation of the component 118 may not delay the generation, communication, or presentation of other components 118. Accordingly, implementations may balance the score-based priority ordering against the time to generate, communicate, or render the components 118, to provide a substantially optimal presentation of the content 128 on the client device 102.

The priority order may also be determined based on a current state of the client device 102 or a current state of data associated with the client device 102 or a user of the client device 102. For example, in cases where the content 128 is a web page for an online store, a determination may be made whether the user has one or more items in a shopping cart or has otherwise indicated items for possible purchase. In such cases, the priority order may indicate a higher priority for one or more components 118 that may enable the purchase, such as a buy button or a checkout button.

In some implementations, the application of the resource condition(s) 1106 may be based on one or more parameters included in one or more configuration files distributed to the server device(s) 108. Such parameters may include the threshold score employed at 1110 to determine a subset of the components 118 to generate, communicate, and present. The parameters may also include the various thresholds included in the resource conditions 1106, such as the threshold processing capacity utilization, threshold number of network connections, threshold network bandwidth, and so forth.

In some implementations, the resource condition(s) 1106 may include local resource conditions, global resource conditions, or both local and global resource conditions. Local resource conditions may include conditions related to a particular client device 102, a particular server device 108, or a particular network connection between a client device 102 and a server device 108. For example, implementations may provide that a subset of the components 118 be generated and communicated by a particular server device 108 if that server device 108 is experiencing a high (e.g., above threshold) processor load. As another example, implementations may provide that a subset of the components 118 be sent to a particular client device 102 if that client device 102 has a small display size or limited processing or storage capacity.

Global resource conditions may include conditions related to a plurality of client devices 102, a plurality of server devices 108, or a network connecting multiple pairs of devices. For example, implementations may provide that a subset of the components 118 be generated and communicated by a server device 108 within a cluster of server devices 108, when the cluster is experiencing a high (e.g., above threshold) processor load or number of requests for content. In some cases, the thresholds associated with the resource conditions 1106, or the threshold scores applied at 1110, may be different based on whether global resource conditions or local resource conditions are being applied. For example, a local resource condition may be present when a particular server device 108 is experiencing at least 80% processing capacity utilization, and a global resource condition may be present when a cluster of server devices 108 is experiencing at least 90% processing capacity utilization across the server devices 108 in the cluster. In such cases, the threshold score may be lower if the local resource condition is present, relative to a higher threshold score that may be applied when the global resource condition is present.

Figure 12:
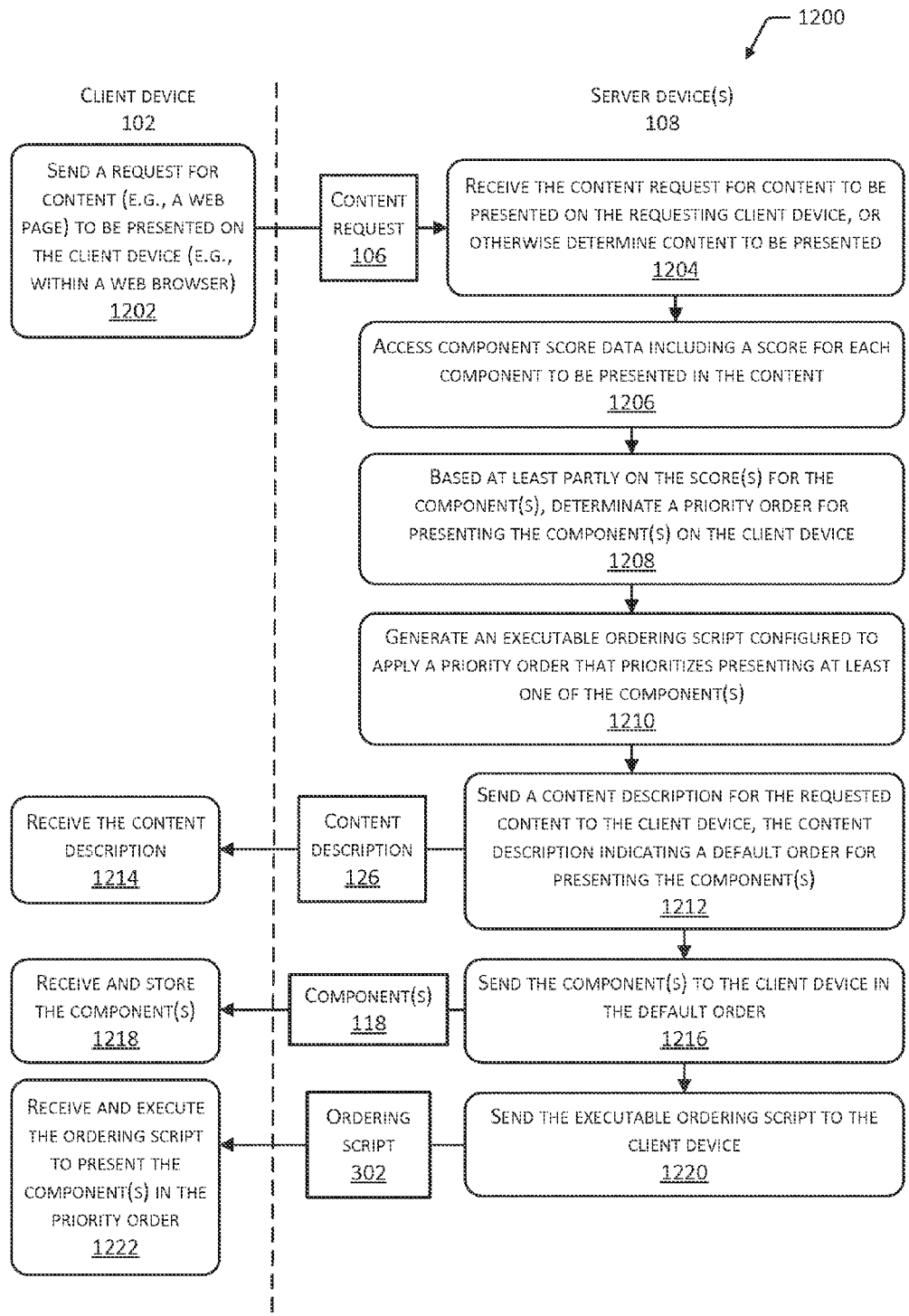
FIG. 12 depicts a flow diagram of a process for communicating a content description and a plurality of components of requested content to a client device, the plurality of components communicated in a default order and presented on the client device in a priority order that is based at least partly on component scores.

FIG. 12 depicts a flow diagram 1200 of a process for communicating the content description 126 and the plurality of components 118 of the requested content 128 to the requesting client device 102. One or more operations of the process may be performed by the client application(s) 104, other modules executing on the client device(s) 102, the content service module 110, the content generation module 112, the order determination module 114, other modules executing on the server device(s) 108, or other modules executing on other devices. In implementations illustrated by FIGS. 3 and 12, the plurality of components 118 for the requested content 128 may be communicated to the client device 102 in a default order and presented on the client device 102 in the priority order that is based at least partly on component scores. As described above with reference to FIG. 3, the priority ordering of the presentation of the components 118 on the client device 102 may be accomplished through execution of the ordering script 302 on the client device 102 (e.g., within the client application(s) 104).

At 1202, the content request 106 is sent from the client device 102 to the server device(s) 108. At 1204, the content request 106 is received at the server device(s) 108. Based on the URI included in the content request 106, or based on other information, the requested content 128 may be determined. The one or more components 118 to be presented in the content 128 may also be determined at 1204. At 1206, the component score data 120 is accessed. At 1208, based at least partly on the score for one or more of the components 118 of the requested content 128, a priority order may be determined for generating the component(s) 118, sending the component(s) 118 to the requesting client device 102, or presenting the component(s) 118 on the requesting client device 102. The operations at 1202, 1204, 1206, and 1208 may proceed similarly as described above with reference to 902, 904, 906, and 908 respectively.

At 1210, the ordering script 302 may be dynamically generated. As described above, the ordering script 302 may be an executable script that is written in a language (e.g., JavaScript™) that is executable within the client application(s) 104. The ordering script 302 may be configured to apply the priority order during the presentation of the components 118 on the client device 102.

At 1212, the content description 126 for the requested content 128 may be sent to the requesting client device 102. The content description 126 may indicate a default order for presenting the components 118, as described above. Alternatively, the content description 126 may indicate the priority order for presenting the components 118. At 1214, the content description 126 is received at the requesting client device 102.

At 1216, the components 118 of the content 128 are sent to the requesting client device 102 in the default order, or in an arbitrary order. At 1218, the components 118 are received at the requesting client device 102. The components 118 may be cached locally on the requesting client device 102 or otherwise stored at 1218.

At 1220, the ordering script 302 is sent to the requesting client device 102. At 1222, the ordering script 302 is received at the requesting client device 102 and may be executed within the client application(s) 104. On execution, the ordering script 302 may retrieve each of the components 118 from local storage and present the components 118 in the priority order determined at 1208. In some implementations, the ordering script 302 may be sent to the client device 102 prior to sending either or both of the content description 126 and the component(s) 118. Sending the ordering script 302 may enable the client device 102 to begin executing the ordering script 302 to present the higher priority components 118 earlier, in some cases before receiving other, lower priority components 118.

The implementations described by FIG. 12 may be employed in situations when the network connection between the client device 102 and the server device(s) 108 has a capacity (e.g., speed or bandwidth) greater than a predetermined threshold capacity. In such cases, the components 118 for the content 128 may be sent to the client device 102 over the high capacity network connection and the processing to apply the priority order may be performed on the client device 102 through execution of the ordering script 302.

In some implementations, the ordering script 302 may further determine the priority order for presenting the components 118, or may determine a subset of the components 118 to present, based on current conditions or characteristics of the client device 102. For example, in cases where the client device 102 has a limited display size or is exhibiting an above threshold usage of memory, storage, or processing capacity, the ordering script 302 may determine to present a subset of the components 118, such as a number of the highest priority components 118.

Moreover, in some implementations the ordering script 302 may determine the priority order based on detecting one or more inputs or events occurring on the requesting client device 102. For example, the ordering script 302 may determine that one or more inputs have been made to the requesting client device 102 to select a particular portion of the content 128 to display, such as a user scrolling down to a particular portion of the content 128. In such cases, the ordering script 302 may determine the priority order to prioritize one or more components 118 that are displayed within the selected portion of the content 128.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
presenting one or more components of a web page within a viewable portion of a display on one or more user devices;
accessing behavioral data collected by at least one client application based on interactions with the one or more components during presentations of the web page on the one or more user devices, the behavioral data collected by the at least one client application including a dwell time that the one or more of the components of the web page are presented within the viewable portion of the display on the one or more user devices as the web page was scrolled to a portion that includes the one or more components presented in the viewable portion of the display;
based at least partly on the behavioral data including the dwell time during which the one or more of the components of the web page were presented within the viewable portion of the display on the one or more user devices, determining a score for the one or more of the components of the web page;
determining a priority order for presenting the one or more of the components of the web page on the display of a requesting user device based on the score for the one or more of the components of the web page;
generating a content description indicating the priority order for presenting the one or more components;
in response to a request for the web page from the requesting user device, sending the content description to the requesting user device; and
after sending the content description to the requesting user device, sending the one or more of the components of the web page to the requesting user device in the priority order.

2. The method of claim 1, wherein:
the accessing the behavioral data collected by the at least one client application based on the interactions with the one or more components during presentations of the web page on the one or more user devices includes determining a scrolling action for positioning a component within a viewable portion of the display or determining cursor positioning relative to the one or more components.

3. The method of claim 1, wherein:
the behavioral data further includes presentation count data describing a number of presentations of the one or more of the components of the web page within the viewable portion of the display on the one or more user devices and transaction data describing whether the user interactions with the one or more of the components resulted in a completed transaction; and
the score is further based on one or more of the presentation count data, such that the priority order further prioritizes presenting the one or more of the components that exhibit a higher number of presentations than other components or the transaction data, such that the priority order further prioritizes presenting the one or more of the components for which previous presentations resulted in the completed transaction.

4. The method of claim 1, wherein:
the behavioral data describes the user interactions of one or more users with the one or more of the components of the web page, the one or more users included in a user segment;
the score is determined based on the behavioral data that describes the user interactions of the one or more users included in the user segment;
the request for the web page is generated by a requesting user of the requesting user device; and
the requesting user is included in the user segment.

5. A system, comprising:
at least one computing device configured to implement one or more services, wherein the one or more services are configured to:
present components of content within a viewable portion of a display on one or more user devices;
access behavioral data describing user interactions with one or more of the components of the content presented on one or more user devices, the behavioral data collected by at least one client application based on the user interactions with the one or more of the components during presentations of the web page on the one or more user devices and including a dwell time that the one or more of the components of the content are presented within the viewable portion of the display on the one or more user devices as the web page was scrolled to a portion that includes the one or more components presented in the viewable portion of the display;
based at least partly on the behavioral data including the dwell time during which the one or more of the components of the content were presented within the viewable portion of the display on the one or more user devices, determine a score for the one or more of the components of the content;
determine a priority order for presenting the one or more of the components of the content on the display of a requesting user device based on the score for the one or more of the components of the content;
generate a content description indicating the priority order for presenting the one or more components;
in response to a request for the web page from the requesting user device, send the content description to the requesting user device; and
after sending the content description to the requesting user device, send the one or more of the components of the content to the requesting user device in the priority order.

6. The system of claim 5, wherein:
the behavioral data describes the user interactions of one or more users with the one or more of the components of a web page, the one or more users included in a user segment;
the score is determined based on the behavioral data that describes the user interactions of the one or more users included in the user segment;
the request for the web page is generated by a requesting user of the requesting user device; and
the requesting user is included in the user segment.

7. The system of claim 5, wherein:
the behavioral data collected by the at least one client application based on the user interactions with the one or more of the components during presentations of the web page on the one or more user devices is further based on determining a scrolling action for positioning a component within a viewable portion of the display or determining cursor positioning relative to the one or more of the components.

8. The system of claim 5, wherein:
the behavioral data further includes presentation count data describing a number of presentations of the one or more of the components of the web page within the viewable portion of the display on the one or more user devices and transaction data describing whether the user interactions with the one or more of the components resulted in a completed transaction; and
the score is further based on one or more of the presentation count data, such that the priority order further prioritizes presenting the one or more of the components that exhibit a higher number of presentations than other components or on the transaction data, such that the priority order further prioritizes presenting the one or more of the components for which the user interactions resulted in the completed transaction.

9. The system of claim 5, wherein sending of the one or more of the components of the content further comprises sending the one or more of the components for which the score is at least a threshold score, based on one or more criteria including one or more of:
the system exhibiting at least a threshold processing capacity utilization;
the system exhibiting at least a threshold memory utilization;
the system being involved in at least a threshold number of network connections with other devices;
the system receiving at least a threshold number of content requests; or
an amount of processing capacity to generate the one or more of the components.

10. The system of claim 5, wherein the sending of the one or more of the components of the content further comprises sending the one or more of the components for which the score is the at least threshold score, based on one or more criteria including one or more of:
a network connection exhibiting less than a threshold network bandwidth;
the network connection exhibiting less than a threshold network speed; or
a size of the one or more of the components.

11. The system of claim 5, wherein the sending of the one or more of the components of the content further comprises sending the one or more of the components for which the score is the at least threshold score, based on determining one or more characteristics of the requesting user device, the one or more characteristics including one or more of:
a size of a display of the requesting user device;
a processing capacity of the requesting user device; or
a memory capacity of the requesting user device.

12. The system of claim 5, wherein:
the content includes a web page configured to be presented in a web browser executing on the requesting user device; and
the web page is at least partly described using Hypertext Markup Language (HTML).

13. The system of claim 5, wherein the one or more of the components of the content include one or more of:
an image;
an executable script;
a text portion; or
an interactive user interface control.

14. The system of claim 5, wherein:
the behavioral data describes the user interactions of the one or more users with the one or more of the components of the content, the one or more users included in the user segment;
the score is determined based on the behavioral data that describes the user interactions of the one or more users included in the user segment;
the request for the content is generated by a requesting user of the requesting user device; and
the requesting user is included in the user segment.

15. One or more non-transitory computer-readable media storing instructions which, when executed by at least one processor, instruct the at least one processor to perform actions comprising:
receiving a content description listing a default order for one or more of components of content to be presented on a requesting user device;
receiving an ordering script that is executable to apply a priority order that prioritizes an order of presenting at least one component of the plurality of components, the priority order based at least partly on a score determined using behavioral data collected by at least one client application based on interactions with the one or more of the components during presentation on one or more user devices, the behavioral data including a dwell time that the one or more of the components of the content were presented during previous interactions within a viewable portion of a display on the one or more user devices as the web page was scrolled to a portion that includes the at least one component of the plurality of components presented in the viewable portion of the display;
after receiving the ordering script, receiving the at least one component of the plurality of components; and
executing the ordering script to present the at least one component of the plurality of components of the content in the priority order on the requesting user device instead of the default order according to the content description.

16. The one or more non-transitory computer-readable media of claim 15, the actions further comprising:
receiving the plurality of components at the requesting user device in the priority order.

17. The one or more non-transitory computer-readable media of claim 15, the actions further comprising:
receiving the plurality of components at the requesting user device, in an order that is indicated by the content description, the order being different than the priority order.

18. The one or more non-transitory computer-readable media of claim 15, wherein the priority order is further determined based on one or more of:
a size of a display of the requesting user device;
a processing capacity of the requesting user device; or
a memory capacity of the requesting user device.

19. The one or more non-transitory computer-readable media of claim 15, wherein:
the actions further comprise detecting, on the requesting user device, one or more inputs to select a portion of the content to present on the requesting user device; and
the determining of the priority order further comprises prioritizing presenting the at least one component that is indicated by the content description as being presented within the selected portion of the content.

20. The one or more non-transitory computer-readable media of claim 15, wherein:

the content includes a web page configured to be presented in a web browser executing on the requesting user device; and the web page is at least partly described using Hypertext Markup Language (HTML).

* * * * *